(12) United States Patent
Goto

(10) Patent No.: US 8,035,891 B2
(45) Date of Patent: Oct. 11, 2011

(54) PHOTONIC BANDGAP FIBER

(75) Inventor: Ryuichiro Goto, Sakura (JP)

(73) Assignee: Fujikura Ltd., Tokyo (JP)

( * ) Notice: Subject to any disclaimer, the term of this patent is extended or adjusted under 35 U.S.C. 154(b) by 60 days.

(21) Appl. No.: 12/429,683

(22) Filed: Apr. 24, 2009

(65) Prior Publication Data

US 2009/0207485 A1   Aug. 20, 2009

Related U.S. Application Data

(63) Continuation of application No. PCT/JP2007/071233, filed on Oct. 31, 2007.

(30) Foreign Application Priority Data

Nov. 1, 2006  (JP) ................................. 2006-297522
Apr. 20, 2007  (JP) ................................. 2007-111552

(51) Int. Cl.
*G02B 6/02* (2006.01)
*G02B 6/036* (2006.01)
*H04B 10/17* (2006.01)

(52) U.S. Cl. ...................... 359/341.1; 385/122; 385/123; 385/124; 385/125; 385/126; 385/127; 385/141

(58) Field of Classification Search ............... 341/341.1; 385/122–127, 141; 359/341.1
See application file for complete search history.

(56) References Cited

U.S. PATENT DOCUMENTS

| 5,216,728 | A  | * | 6/1993 | Charlton et al. ................. 385/27 |
| 6,404,966 | B1 |   | 6/2002 | Kawanishi et al. |
| 7,272,287 | B2 | * | 9/2007 | Bise et al. ..................... 385/123 |
| 7,349,611 | B2 |   | 3/2008 | Broeng et al. |
| 7,362,937 | B2 | * | 4/2008 | Katayama et al. ............ 385/123 |
| 2003/0039026 | A1 | | 2/2003 | Nishihara et al. |
| 2005/0105867 | A1 | * | 5/2005 | Koch et al. ..................... 385/125 |
| 2006/0078009 | A1 | | 4/2006 | Katayama et al. |

(Continued)

FOREIGN PATENT DOCUMENTS

JP   2003-031879 A   1/2003

(Continued)

OTHER PUBLICATIONS

Nielsen et al. "Investigations of the coupling between core modes and cladding modes in a double clad Yb-doped photonic crystal fiber", Proceedings of SPIE vol. 5335, pp. 181-191, (Jun. 7, 2004).*

(Continued)

*Primary Examiner* — Eric Bolda
(74) *Attorney, Agent, or Firm* — Sughrue Mion, PLLC

(57) ABSTRACT

A photonic bandgap fiber includes a core and a cladding that surrounds the core. In this photonic bandgap fiber, high refractive index portions which have a refractive index higher than that of a medium of the cladding are provided in the cladding so as to form a triangular lattice structure with a lattice constant Λ, and the refractive index of the core is higher than the refractive index of the medium of the cladding and lower than the refractive index of the high refractive index portion. The coupling length between the core and the high refractive index portion that is closest to the core is longer than the coupling length between adjacent high refractive index portions, or a periodic structure formed by the high refractive index portions is not provided around the entirely of the area along the circumference of the core.

20 Claims, 17 Drawing Sheets

U.S. PATENT DOCUMENTS

2006/0257071 A1    11/2006   Bise et al.
2007/0230884 A1*   10/2007   Minelly et al. ................ 385/125

FOREIGN PATENT DOCUMENTS

| JP | 2003-069116 A | 3/2003 |
| JP | 2004-252057 A | 9/2004 |
| JP | 2006-093613 A | 4/2006 |
| WO | 02/101429 A2  | 12/2002 |

OTHER PUBLICATIONS

Ryuichiro Goto et al., "Silica-Based Wide-Band Solid Photonic Band-Gap Fibre", IEICE Technical Report, Aug. 17, 2006, pp. 39-42, vol. 106, No. 210.

Futakuchi Kazunari et al., "Airhole-gata YB Tenka Double Clad Fiber", Proceedings of the IEICE General Conference, Mar. 3, 2003, p. 228.

L.A. Zenteno et al., "Suppression of Raman gain in single-transverse-mode dual-assisted fiber", Optics Express, Oct. 31, 2005, pp. 8921-8926, vol. 13, No. 22.

J.M. Fini et al., "Suppression of stimulated Raman scattering in a cladding pumped amplifier with an Yb-doped filter fiber", CLEO2006.

J.D. Love et al., "Radiation from single-mode helical fibres", Electronics Letters, Oct. 8, 1987, pp. 1109-1110, vol. 23, No. 21.

* cited by examiner

PHOTONIC BANDGAP FIBER

CROSS REFERENCE TO RELATED APPLICATIONS

This application is a Continuation of International Application No. PCT/JP2007/071233 filed Oct. 31, 2007, claiming priority based on Japanese Patent Application Nos. 2006-297522 and 2007-11552 filed Nov. 1, 2006 and Apr. 20, 2007, the contents of all of which are incorporated herein by reference in their entirety.

TECHNICAL FIELD

Exemplary embodiments of the present invention relate to a photonic bandgap fiber, in particular, to a photonic bandgap fiber that enhances the performance of suppressing stimulated Raman scattering and amplified spontaneous emission generated in an optical fiber.

BACKGROUND ART

In recent years, high-power optical amplifiers (fiber lasers, fiber amplifiers) using a rare-earth doped optical fiber have received attention. Among these, since high-power fiber lasers have the characteristics of being easily cooled and offering high beam quality compared to solid-state lasers, they are attracting a great amount of attention particularly in the field of laser machining. In a high-power fiber laser, a pumping light and a signal light propagate through a fiber, and the signal light is amplified by a stimulated emission process due to the population inversion of rare-earth ions that are pumped by the pumping light. This high-power fiber laser has an amplifying fiber that amplifies the signal light and a light-guiding fiber that guides the amplified signal light to a predetermined place. However, as the output power of fiber lasers has increased, two problems have become evident.

The first problem is stimulated Raman scattering. When stimulated Raman scattering occurs, a part of the output of the signal light is converted into a light (a Stokes light) having a longer wavelength, thus the output power of the signal light falls. This is a problem in both the amplifying fiber and the light-guiding fiber.

One more problem is the amplified spontaneous emission. In the amplifying fiber, in addition to the stimulated emission that amplifies the signal light, spontaneous emission is generated from the rare-earth ions. When this spontaneous emission propagates through the fiber together with the signal light, the spontaneous emission is amplified by the pumping light, leading to a drop in the pumping light that is used for amplification of the signal light, and as a result the output power of the signal light decreases. This is a problem in the amplifying fiber.

In order to rectify these problems, two measures have been proposed. The first measure uses a fiber whose cut-off wavelength of the fundamental mode exists at a wavelength that is longer than the wavelength of the signal light. Thereby, it is possible to suppress propagation of light of longer wavelengths than the signal light, suppress propagation of Raman scattering light and light on the longer wavelength side, and reduce stimulated Raman scattering light and amplified spontaneous emission at longer wavelengths (see "Suppression of Raman Gain in Single-Transverse-Mode Dual-Hole Assisted Fiber," Optics Express, 13, pp. 8921, 2005). The other measure is a method that involves disposing a ring around a core so as to couple Raman scattering light and spontaneous emission that are guided through the core to a mode that is guided through the ring and cause radiation (see "Suppression of Stimulated Raman Scattering in a Cladding Pumped Amplifier with an Yb-Doped Fiber," CLEO2006).

However, there are the following problems in the conventional art.

In the fiber that is disclosed in the Suppression of Raman Gain publication, since the cut-off wavelength of the fundamental mode exists at a wavelength that is longer than the wavelength of the signal light, it is not possible to suppress spontaneous emission on the shorter wavelength side than the wavelength of the signal light.

In the fiber that is disclosed in the Suppression of Stimulated Raman Scattering publication, since the coupling to the mode guided through the ring exists at many wavelengths, even the signal light may be suppressed due to manufacturing variations, so that manufacturing is difficult or the tolerance with respect to manufacturing variations is low. Also, since the coupling to the mode that is guided through the ring exists at a comparatively narrow band of approximately 10 nm to 30 nm, it is difficult to accurately match the band to the wavelengths that need to be suppressed in terms of manufacturing, and a band of Raman scattering cannot be entirely covered, and suppression of the spontaneous emission can only be performed in a restricted band.

Exemplary embodiments of the present invention were devised in view of the above circumstances and have an objective to provide an optical fiber that is capable of effectively suppressing propagation of light on either shorter wavelengths or longer wavelengths other than the signal light, and that can be manufactured so that there is no suppression within the wavelength of the signal light without a wavelength in the propagation region at which loss increases rapidly.

SUMMARY OF THE INVENTION

In order to achieve the above and other exemplary objects, according to an exemplary aspect of the present invention, a photonic bandgap fiber includes a core, a cladding that surrounds the core, and a plurality of high refractive index portions disposed within the cladding, the plurality of high refractive index portions have a refractive index higher than a refractive index of the cladding and are provided in the cladding to form a triangular lattice structure with a lattice constant $\Lambda$, a refractive index of the core is higher than the refractive index of the cladding and lower than the refractive index of the plurality of high refractive index portions, the lattice comprises a plurality of layers circumferentially surrounding the core, and a coupling length between the core and the plurality of high refractive index portions comprising the innermost ring closest to the core is longer than the coupling length between the plurality of adjacent high refractive index portions.

Furthermore, according a second exemplary embodiment, a photonic bandgap fiber includes core, a cladding that surrounds the core, and a plurality of high refractive index portions disposed within the cladding, the plurality of high refractive index portions have a refractive index higher than a refractive index of the cladding and are provided in the cladding to form a triangular lattice structure with a lattice constant $\Lambda$, a refractive index of the core is higher than the refractive index of the cladding and lower than the refractive index of the plurality of high refractive index portions; the lattice comprises a plurality of layers circumferentially surrounding the core, a coupling length between the core and the plurality of high refractive index portions comprising the innermost ring closest to the core is longer than the coupling length between the plurality of adjacent high refractive index portions, and there is at least one circumferential spacing in the lattice structure.

In the embodiments of the present invention, the photonic bandgap fiber, perturbations, such as twisting or bending, are applied to the fiber in a melted state during drawing such that the photonic bandgap fiber is permanently distorted.

In the embodiments of the present invention, the core may have an optical amplification function.

In the embodiments of the present invention, the fiber may have a double-clad structure in which the cladding is covered with a medium having a lower refractive index than the cladding.

In the embodiments of the present invention, at least a layer of the plurality of high refractive index portions or the surrounding cladding has an optical absorption characteristic.

In the embodiments of the present invention, the fiber may be used in an optical amplifier wherein at least a pumping light and a signal light may propagate through the fiber, and at least a pumping light having a wavelength of 915 nanometers (nm) and a signal light having a frequency of 1060 nm propagate through the fiber, and at least one layer of the plurality of high refractive index portions or the surrounding cladding does not have an optical absorption characteristic with respect to the pumping light.

Also, the present invention relates to an optical amplifier that has the aforementioned photonic bandgap fiber.

In the exemplary embodiments of the present invention, the high refractive index portions form a periodic structure due to the photonic bandgap effect, and a wavelength filter effect occurs not only at a specified wavelength, but over a certain wavelength range. Accordingly, it is possible to provide a fiber that is effective for suppressing the propagation of light with a wavelength range spreading to some extent, by suppressing stimulated Raman scattering and spontaneous emission.

In exemplary embodiments the present invention, the high refractive index portions form a periodic structure due to the photonic bandgap effect, therefore, it is possible to express the effect as a wavelength filter not only at a specified wavelength, but over a certain wavelength range.

In exemplary embodiments of a the present invention, the coupling length between adjacent high refractive index portions is shorter than the coupling length between the core and the high refractive index portion that is closest to the core, therefore, light that has been coupled from the core to the high refractive index portion that is closest to the core easily couples to the surrounding high refractive index portions. As a result, re-coupling from the high refractive index portions to the core is suppressed, and it is possible to increase the effect of a wavelength filter.

In a second exemplary embodiment of the present invention, the periodic structure formed by the high refractive index portions is not provided around the entirely of the area along the circumference of the core, therefore, the unneeded high-order modes leak out to the cladding through a region where there is no periodic structure, and it is possible to shorten the cut-off wavelength.

In the exemplary embodiments of the present invention, it is possible to change the filter wavelength and enhance the wavelength filter effect by applying perturbations, such as bending and twisting, to the fiber.

In the exemplary embodiments of the present invention, it is possible for twisting to be applied to the fiber in a melted state during drawing, and permanent twisting is introduced, therefore, light that has leaked out to the high refractive index portion in the cladding suffers losses, such as macrobending loss and microbending loss, caused by the twisting, whereby it is possible to further enhance the wavelength filter effect. Also, since the twisting is introduced while the fiber is in a melted state, the twisting is not accompanied by the generation of stress, as compared to applying twisting after hardening, and it is possible to apply much more twisting.

In exemplary embodiments of the present invention, the core has an optical amplification function, therefore, it is possible to prevent unnecessary light from being amplified in the amplifying fiber.

In exemplary embodiments of the present invention, it is possible for the fiber to have a double-clad structure in which the cladding is covered with a medium having a lower refractive index than the cladding when used in an optical amplifier, therefore, it is possible to take in more pumping light and to increase the output power of the optical amplifier.

A medium with a low refractive index includes fluorinated polymers, air holes, and glass that lowers the refractive index by incorporating numerous tiny bubbles on a wavelength's order of the pumping light.

In exemplary embodiments of the present invention, it is possible for at least a portion of the high refractive index portions or the surrounding cladding to have an optical absorption characteristic, therefore, it is possible to more effectively remove light that has leaked out to the cladding.

Also, there is no need for all regions of the high refractive index portions and the surrounding cladding to have absorption characteristics, and by optimizing the position of offering absorption, it is possible to apply sufficiently large absorption to unnecessary wavelengths and reduce absorption to the signal light. For example, by only the outermost circumference portions of the high refractive index portions having absorption characteristics, it is possible to effectively cause the absorption of unneeded wavelengths that are guided through the high refractive index portions while also suppressing the effect of the signal light being absorbed by the absorption medium to a minimum.

When exemplary embodiments of the present invention are used in an optical amplifier with a double-clad structure in which at least the pumping light and the signal light propagate, the high refractive index portions and the surrounding cladding do not have optical absorption characteristics with respect to the pumping light, therefore, it is possible to suppress the loss of the pumping light to a low level.

Exemplary embodiments of the present invention can apply an extremely large loss to a wavelength of Raman scattering light of the signal light, even if spontaneous Raman scattering occurs, therefore, it does not propagate through the fiber. Since the electric field profile greatly differs between the wavelengths of the signal light and Raman scattering light, even if spontaneous Raman scattering light propagates through the fiber, the interaction between the spontaneous Raman scattering light and the signal light is extremely small, and accordingly it is possible to suppress the generation of stimulated Raman scattering.

Also, in exemplary embodiments of the present invention, by suitably combining the wavelength of the signal light and the wavelength characteristic of the fiber, it is possible to suppress the second-order Raman scattering while the first-order stimulated Raman scattering is not suppressed.

Also, in exemplary embodiments of the present invention, the core is provided inside the periodic structure at the wavelength of the signal light, therefore, it is possible to obtain a splice characteristic that is the same as a general optical fiber.

Also, in exemplary embodiments of the present invention, the transmission band of the spontaneous emission that propagates together with the signal light through the fiber and is amplified narrows, therefore, it is possible to suppress the optical output that is attributed to the spontaneous emission.

Also, in exemplary embodiments of the present invention, by forming the glass portion entirely with a silica glass material, it is possible to reduce propagation loss.

BEST MODE FOR CARRYING OUT THE INVENTION

Hereinbelow, the present invention is described in detail based on the exemplary embodiments. Each embodiment described is an example of the present invention, and the present invention is not to be limited to only the disclosure of these embodiments.

Figure 1:
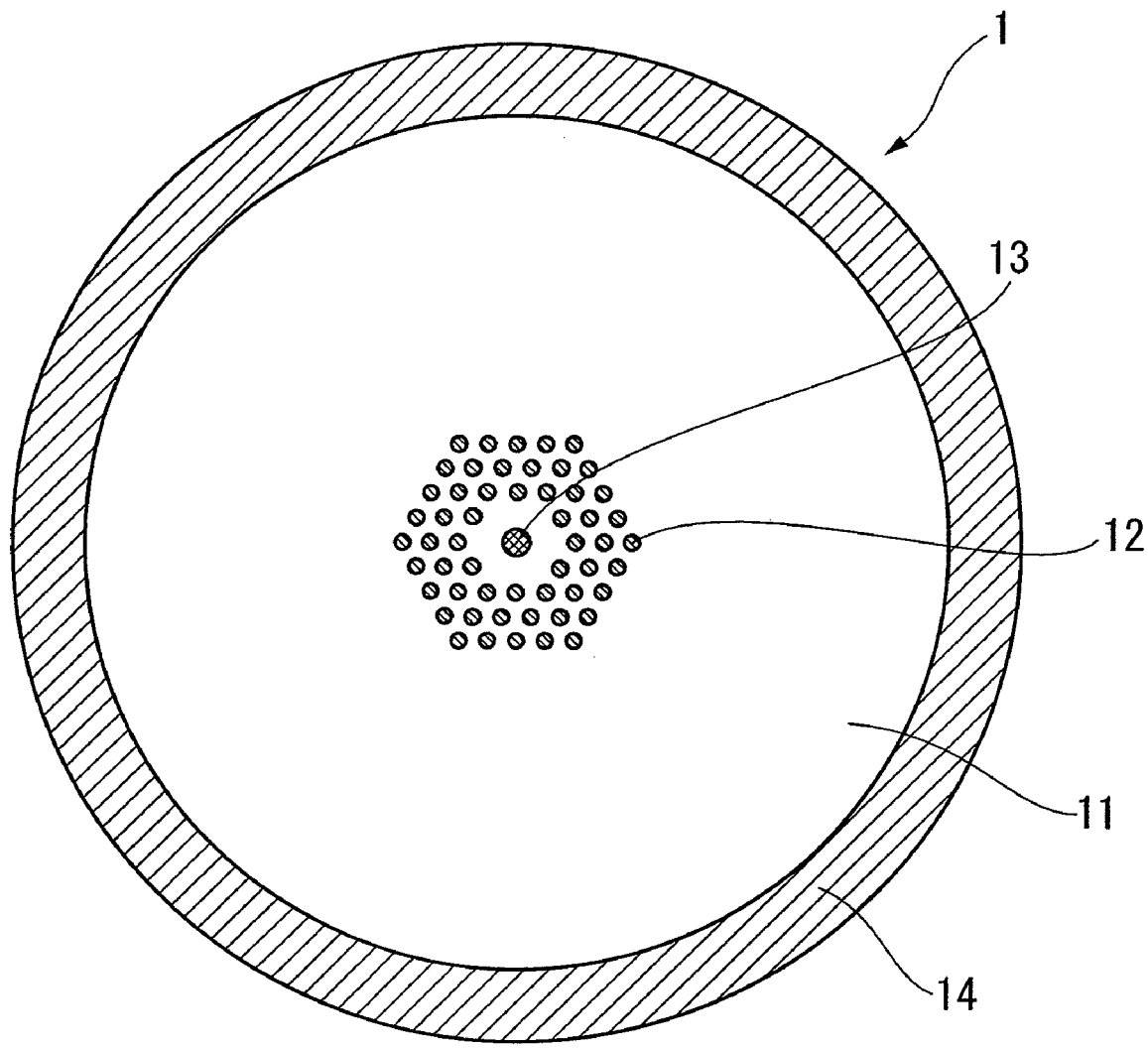
FIG. 1 is a cross-sectional view that shows the structure of a light-guiding fiber of exemplary Embodiment 1 according to the present invention.

FIG. 1 is a cross-sectional view that shows the structure of a light-guiding fiber of exemplary Embodiment 1. In light-guiding fiber 1, high refractive index portions 12, which are made of germanium dioxide doped silica glass and have a relative refractive-index difference of 2.8% with respect to pure silica glass, are provided in a first cladding 11 made of pure silica glass with a triangular lattice structure that forms a periodic photonic band.

The photonic band has a layered structure circumferentially centered around a first core 13, having a relative refractive-index difference of 0.3% with respect to pure silica glass, where each layer comprises a ring of adjacent high index refraction portions together forming a lattice structure with a lattice constant $\Lambda$. A spacing equivalent to the size of a layer including six high refractive index portions resides between the core 13 and the innermost high refractive index portions of the lattice structure. For example, such a lattice structure can provide a spacing of at least $\sqrt{3}\Lambda$ between the core and the high refractive index portions of the innermost layer.

An interval $\Lambda$ between the high refractive index portions 12 is 5.5 micrometers ($\mu$m), the diameter d of the high refractive index portion 12 is $0.5\Lambda$, and the diameter of the first core 13 is $1\Lambda$. Also, the periodic structure of the high refractive index portions 12 is formed in three layers.

In the light-guiding fiber of Embodiment 1, a coupling length Lc2 between adjacent high refractive index portions is shorter than a coupling length Lc1 between the core and the high refractive index portion that is closest to the core. For this reason, light that is coupled from the core to the high refractive index portion that is closest to the core moreover easily couples to the surrounding high refractive index portion, and as a result, re-coupling from the high refractive index portion to the core is suppressed, and it is possible to increase the effect of a wavelength filter.

Figure 21:
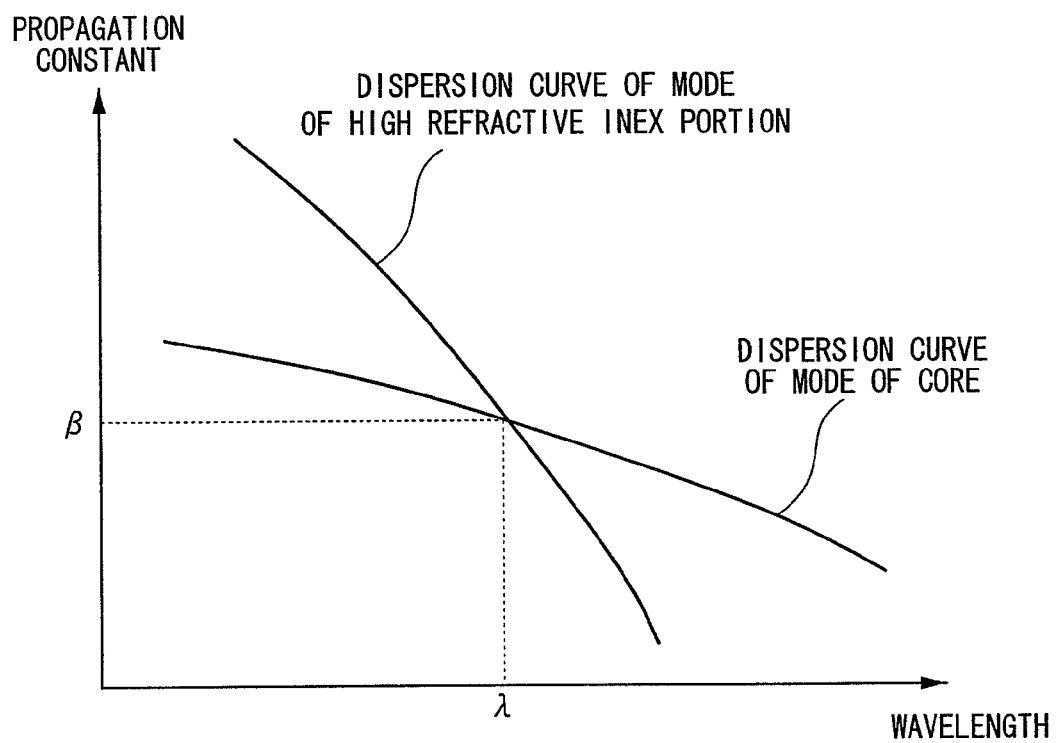
FIG. 21 is a graph that shows the matching of the propagation constants of a core of a fiber in which the high refractive index portions do not have a periodic structure, and a mode that is guided through the high refractive index portion.

Here, coupling length is defined as the length that is required for power to move from one waveguide to another waveguide in the case of two waveguides being disposed adjacently and, as shown in FIG. 21, the propagation constants of specific modes of the two waveguides at a wavelength $\lambda$ matching at $\beta$, and a power exchange occurring between the two waveguides by the mode coupling.

Based on this definition, the coupling length $Lc_1$ between the core and the high refractive index portion that is closest to the core can be expressed in the following manner. Assuming the core and one of the high refractive index portions closest to the core to be respectively independent waveguides, in the case of the propagation constants of specified modes of the two individual waveguides at a wavelength $\lambda$ matching at a value $\beta$, at the wavelength $\lambda$, let the refractive index profile of a total of the two waveguides be n (x, y), the refractive index profile of only the core be $n_{core}$ (x, y), the electric field profile of the mode that is guided through the core and whose propagation constant is $\beta$ be $E_{core}$ (x, y), the refractive index profile of only the high refractive index portion be $n_{high}$ (x, y), and the electric field profile of the mode that is guided through the high refractive index portion and whose propagation constant is $\beta$ be $E_{high}$ (x. y). At this time, the coupling length Lc1 can be expressed by the following.

$$Lc_1 = \frac{\pi}{2 \cdot \sqrt{\kappa_{12} \cdot \kappa_{21}}}$$

-continued $$\kappa_{12} = \frac{k_0^2}{2\beta} \frac{\int_{-\infty}^{+\infty}\int_{-\infty}^{+\infty}(n^2(x,y)-n_{core}^2(x,y))\cdot E_{core}(x,y)\cdot E_{high}^*(x,y)\,dx\,dy}{\int_{-\infty}^{+\infty}\int_{-\infty}^{+\infty}E_{core}(x,y)\cdot E_{core}^*(x,y)\,dx\,dy}$$

$$\kappa_{21} = \frac{k_0^2}{2\beta} \frac{\int_{-\infty}^{+\infty}\int_{-\infty}^{+\infty}(n^2(x,y)-n_{high}^2(x,y))\cdot E_{high}(x,y)\cdot E_{core}^*(x,y)\,dx\,dy}{\int_{-\infty}^{+\infty}\int_{-\infty}^{+\infty}E_{high}(x,y)\cdot E_{high}^*(x,y)\,dx\,dy}$$

Note that $k_0$ is the wavenumber of light in a vacuum, and $k_0 = 2\pi/\lambda$.

The coupling length $Lc_2$ between adjacent high refractive index portions can be expressed in the following manner. Assuming one high refractive index portion and another high refractive index portion that is adjacent thereto to be respectively independent waveguides, since the two waveguides have the same structure, the propagation constants of a mode of the same order match at all wavelengths, and so, at a wavelength $\lambda$, the modes whose propagation constants match at $\beta$ exist. At the wavelength $\lambda$, let the refractive index profile of a total of the two waveguides be $n'(x, y)$, the refractive index profile of only the first high refractive index portion be $n_{high1}(x, y)$, the electric field profile of the mode that is guided through the first high refractive index portion and whose propagation constant is $\beta$ be $E_{high1}(x, y)$, the refractive index profile of only the other adjacent high refractive index portion be $n_{high2}(x, y)$, and the electric field profile of the mode that is guided through the other adjacent high refractive index portion and whose propagation constant is $\beta$ be $E_{high2}(x, y)$. At this time, the coupling length $Lc_2$ can be expressed by the following.

$$Lc_2 = \frac{\pi}{2\cdot\sqrt{\kappa'_{12}\cdot\kappa'_{21}}}$$

$$\kappa'_{12} = \frac{k_0^2}{2\beta} \frac{\int_{-\infty}^{+\infty}\int_{-\infty}^{+\infty}(n'^2(x,y)-n_{high1}^2(x,y))\cdot E_{high1}(x,y)\cdot E_{high2}^*(x,y)\,dx\,dy}{\int_{-\infty}^{+\infty}\int_{-\infty}^{+\infty}E_{high1}(x,y)\cdot E_{high1}^*(x,y)\,dx\,dy}$$

$$\kappa'_{21} = \frac{k_0^2}{2\beta} \frac{\int_{-\infty}^{+\infty}\int_{-\infty}^{+\infty}(n'^2(x,y)-n_{high2}^2(x,y))\cdot E_{high2}(x,y)\cdot E_{high1}^*(x,y)\,dx\,dy}{\int_{-\infty}^{+\infty}\int_{-\infty}^{+\infty}E_{high2}(x,y)\cdot E_{high2}^*(x,y)\,dx\,dy}$$

Here, if $Lc_1 > Lc_2$, light that has coupled from the core to the high refractive index portion that is closest to the core couples to the surrounding high refractive index portion faster than re-coupling to the core. As a result, re-coupling from the high refractive index portion to the core is suppressed, and it is possible to increase the wavelength filter effect.

Figure 22:
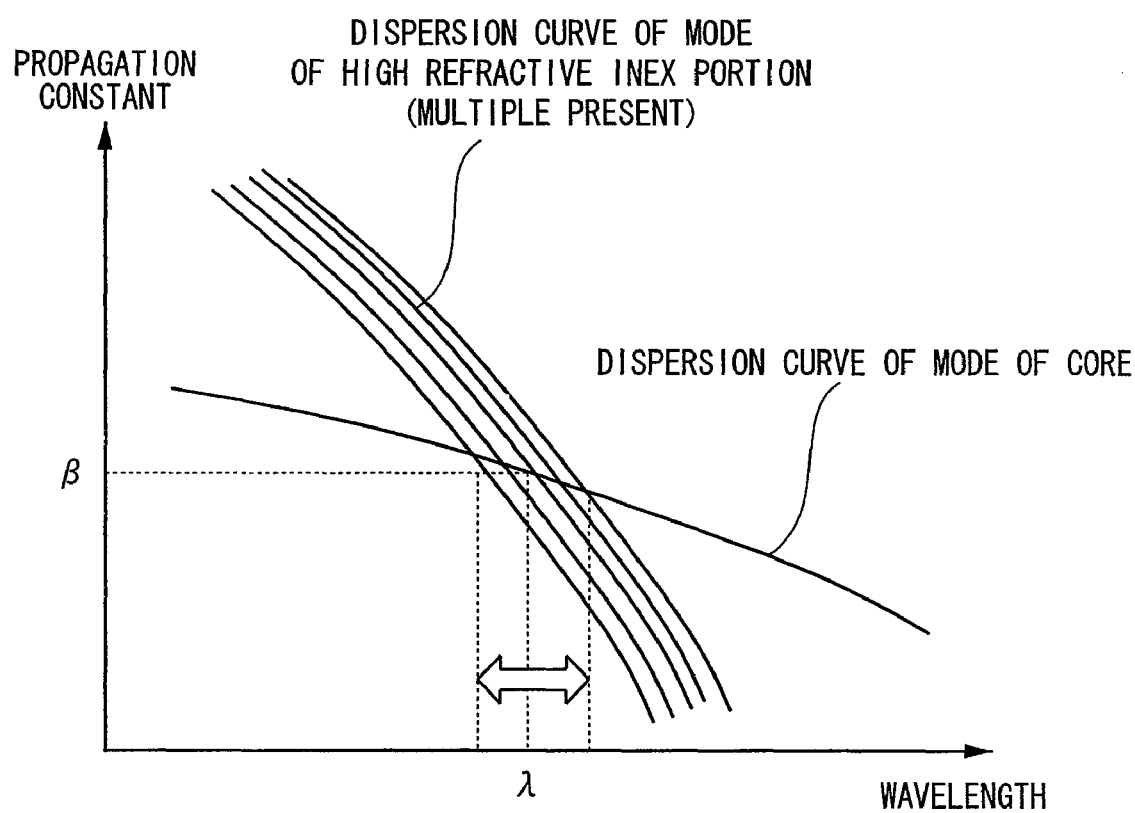
FIG. 22 is a graph that shows the matching of the propagation constants of a core of a fiber in which the high refractive index portions have a periodic structure, and a mode that is guided through the high refractive index portion.

Also, in an exemplary embodiment of the photonic bandgap fiber of the present invention, since the high refractive index portions form the periodic structure, due to the interaction among the high refractive index portions, many modes with proximal propagation constants propagate through the high refractive index portions, and so the propagation constants spread to some extent. For that reason, matching of the propagation constants of the mode that is guided through the core and the mode that is guided through the high refractive index portion occur over a certain wavelength range as shown in FIG. 22. When providing only one high refractive index portion, since the wavelength at which the propagation constants of the mode that propagates through the core and the mode that is guided through the high refractive index portion match at only one point, the wavelengths in which light that propagates through the core couples to the high refractive index portion so that the wavelength filter effect appears is extremely narrow band as shown in FIG. 21. However, when providing the high refractive index portions to form a periodic structure, since the propagation constants match over a certain wavelength range, the wavelength filter effect appears along a certain wavelength range. As the number of layers of the periodic structure, provided there are three layers or more, it is possible to obtain the wavelength range filter property.

In an exemplary embodiment of the photonic bandgap fiber, many modes with proximal propagation constants propagate through the high refractive index portions, and since these respective modes with proximal propagation constants have extremely similar characteristics, there is no problem using the value of $Lc_1$ for the coupling length.

The diameter of the first cladding 11 made of pure silica glass is 300 μm, and a fluorine-based ultraviolet curable resin layer 14 with a relative refractive-index difference of –4% with respect to pure silica glass is disposed around the first cladding 11, resulting in a so-called double-clad structure in which multi-modes are guided while serving the first cladding 11 made of pure silica glass as a second core, and the fluorine-based ultraviolet curable resin layer 14 as a second cladding.

Ytterbium is added to the fluorine-based ultraviolet curable resin layer 14, and the fiber is manufactured so that the propagation loss of multi-mode light around a wavelength of 915 nanometers (nm) that is guided through the second core is 5 decibels per meter (dB/m). The concentration of added ytterbium is in the range of 1,000 to 10,000 parts per million (ppm).

Figure 2:
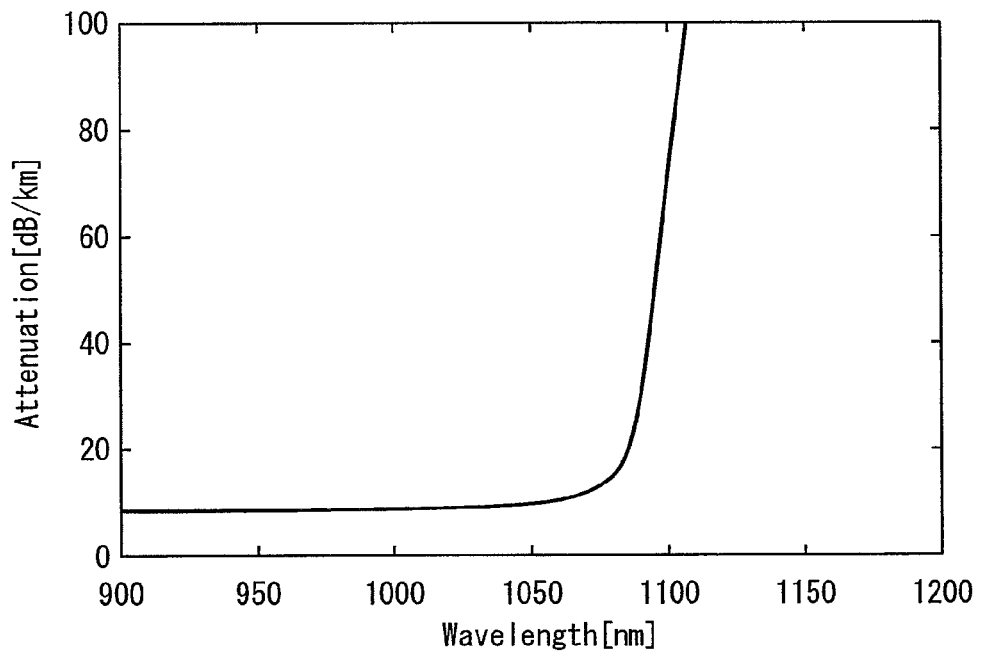
FIG. 2 is a graph that shows the transmission characteristics of the light-guiding fiber of exemplary Embodiment 1.

FIG. 2 shows the transmission loss of the waveguide structure constructed by the first core 13 and the first cladding 11 of this light-guiding fiber 1. It shows that, for light of a wavelength of 1.06 μm that is the output light from an ytterbium doped fiber laser, the loss is as low as 20 dB/km, but for light of a wavelength of 1.1 μm to 1.2 μm that corresponds to Raman scattering light of the signal light, the loss is extremely large at 50 decibels per kilometer (dB/km) or more.

Figure 3:
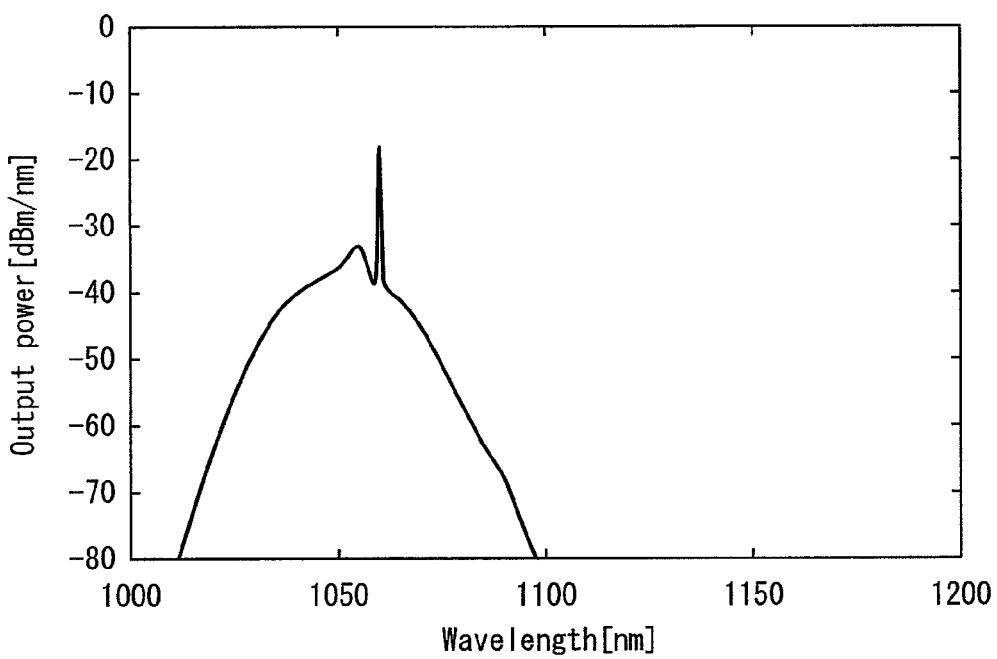
FIG. 3 is a graph that shows the spectrum of output light from the light-guiding fiber of exemplary Embodiment 1.

This light-guiding fiber 1 was extracted by 10 meters (m), and fusion-spliced with an amplifying fiber (Yb-doped double-clad fiber in which Yb is added to the core at 10,000 ppm) for a fiber laser with the same fiber diameter of 300 μm. Since the light-guiding fiber 1 is, similarly to the amplifying fiber, entirely made of silica-based glass, it is easily fusion-spliced to the amplifying fiber. A signal light source (wavelength of 1.06 μm) was connected to the light-guiding fiber 1, and four pumping light sources with a wavelength of 0.915 μm were connected to the amplifying fiber via a beam combiner to constitute the fiber laser. The pulse output of the fiber laser was adjusted so that the output power of the signal light from the light-guiding fiber 1 becomes –18 decibels relative to 1 milliwatt per nanometer (dBm/nm), and the spectrum of the output light was observed. FIG. 3 shows the spectrum of the output light.

From FIG. 3, it is evident that this light-guiding fiber 1 effectively suppresses stimulated Raman scattering without the output power of a wavelength range of the 1.1 μm to 1.2 μm due to stimulated Raman scattering being observed.

Moreover, although the pumping light that has not been converted to the signal light also launches from the amplifying fiber to the light-guiding fiber 1, since both fibers have the same diameter and the light-guiding fiber 1 has a double-clad structure, there was no rapid radiation of pumping light at the fusion-splicing point, and so overheating at the fusion-splicing point did not occur. Moreover, since the propagation loss of the pumping light in the light-guiding fiber 1 was 5 dB/m, the pumping light was attenuated by 50 dB after 10 m of propagation, and a lot of pumping light was not emitted from the light-guiding fiber.

Figure 4:
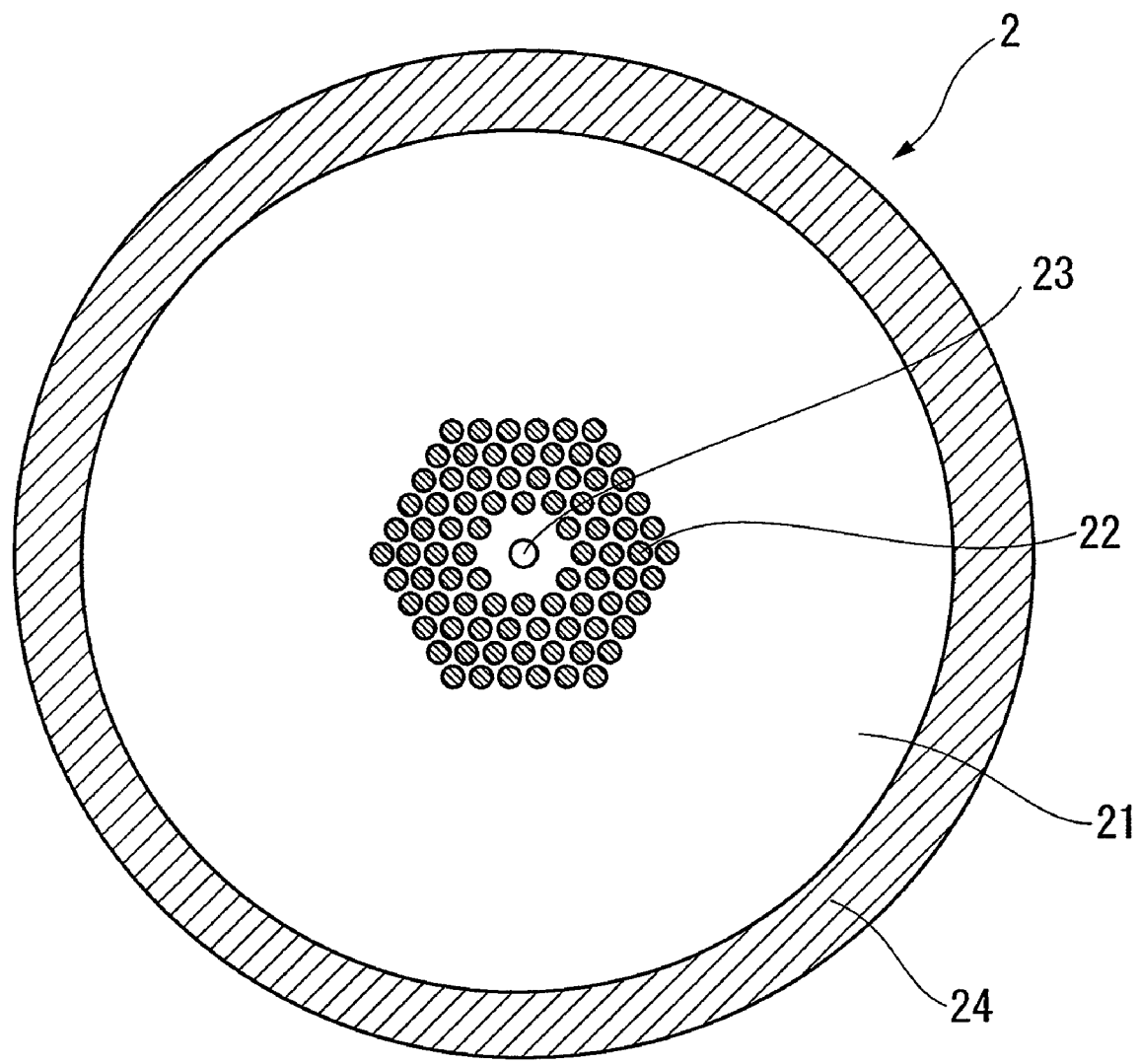
FIG. 4 is a cross-sectional view of an amplifying fiber of exemplary Embodiment 2 according to the present invention.

FIG. 4 is a cross-sectional view that shows the structure of an amplifying fiber 2 of exemplary Embodiment 2 according to the present invention.

In the amplifying fiber 2, high refractive index portions 22 which are made of germanium dioxide doped silica glass, and have a relative refractive-index difference of 2.5% with respect to pure silica glass, are provided in a first cladding 21 made of pure silica glass with a triangular lattice periodic structure to form a photonic band. Similarly to Embodiment 1, the triangular lattice structure has a layered structure circumferentially centered around a core 23, which functions as an amplification medium by doping ytterbium oxide in pure silica glass and has a relative refractive-index difference of 0.3% with respect to pure silica glass, where each layer comprises a ring of adjacent high index refraction portions together forming a lattice structure with a lattice constant Λ. A spacing equivalent to the size of a layer including six high refractive index portions resides between the core 23 and the innermost high refractive index portions of the lattice structure. For example, such a lattice structure can provide a spacing of at least $\sqrt{3}\Lambda$ between the core and the high refractive index portions of the innermost layer.

An interval Λ between the high refractive index portions 22 is 6 μm, the diameter d of the high refractive index portion 22 is 0.8 Λ, and the diameter of the first core 23 is 1 Λ.

Also, the diameter of the first cladding 21 made of pure silica glass is 300 μm, and a fluorine-based ultraviolet curable resin layer 24 with a relative refractive-index difference of −4% with respect to pure silica glass is disposed around the first cladding 21, resulting in a so-called double-clad structure in which multi-modes are guided while utilizing the first cladding 21 made of pure silica glass as a second core and the fluorine-based ultraviolet curable resin layer 24 as a second cladding.

Figure 5:
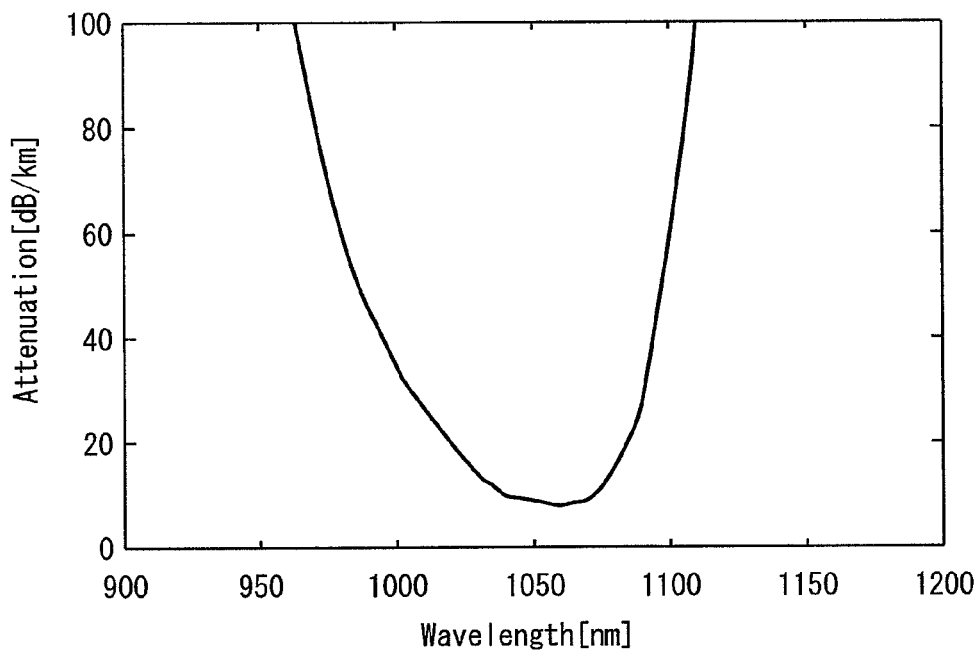
FIG. 5 is a graph that shows the transmission characteristics of the amplifying fiber of exemplary Embodiment 2 (without rare earth addition).

First, a fiber was manufactured according to Embodiment 2, except for not adding ytterbium to the first core 23. FIG. 5 shows the transmission spectrum of the first core 23 of the fiber.

As shown in FIG. 5, the loss of light having a wavelength of 1.06 μm, which is the wavelength of the signal light, is as low as 20 dB/km. On the other hand, the loss of light having a wavelength of 1.1 μm or more becomes 50 dB/km or more, showing the capability of suppressing stimulated Raman scattering. Moreover, since the loss of light having a wavelength of 915 nm, which is the wavelength of the pumping light, is extremely large at 50 dB/km or more, light of the wavelength of 915 nm is not confined in the first core 23 and performs multi-mode operation by the second core and the second cladding. For that reason, it suggests the capability of being used as an amplifying fiber with a double-clad structure.

Figure 6:
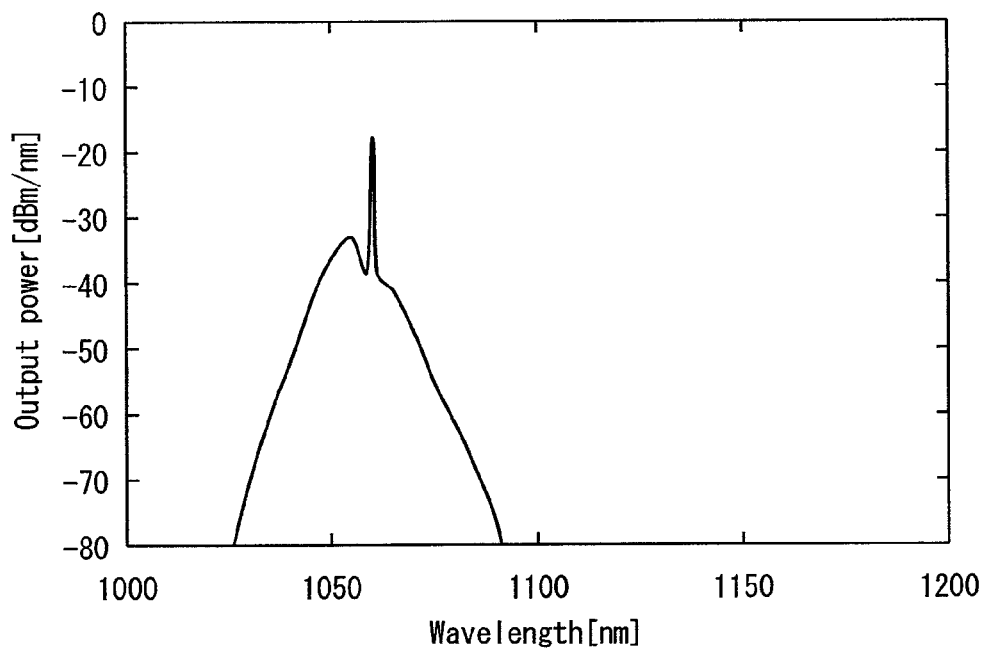
FIG. 6 is a graph that shows the spectrum of output light from the amplifying fiber of exemplary Embodiment 2.

Then, the amplifying fiber 2 that was manufactured so that ytterbium is added to the first core 23 was extracted by 20 m, light of a wavelength of 1.06 μm was launched into the first core 23, and the spectrum of the output power that was obtained by pumping the first cladding with a semiconductor laser with a wavelength of 915 nm was investigated. FIG. 6 shows the measured spectrum of the output light.

From the spectrum shown in FIG. 6, it is evident that the output power of a wavelength of 1.1 μm to 1.2 μm that corresponds to Raman scattering light of the signal light is suppressed. Also, since the output band is about 50 nm, it is evident that the amplified spontaneous emission is also suppressed. Accordingly, the amplifying fiber 2 of the present embodiment is capable of effectively suppressing propagation of light on either shorter wavelengths or longer wavelengths other than the signal light.

Figure 7:
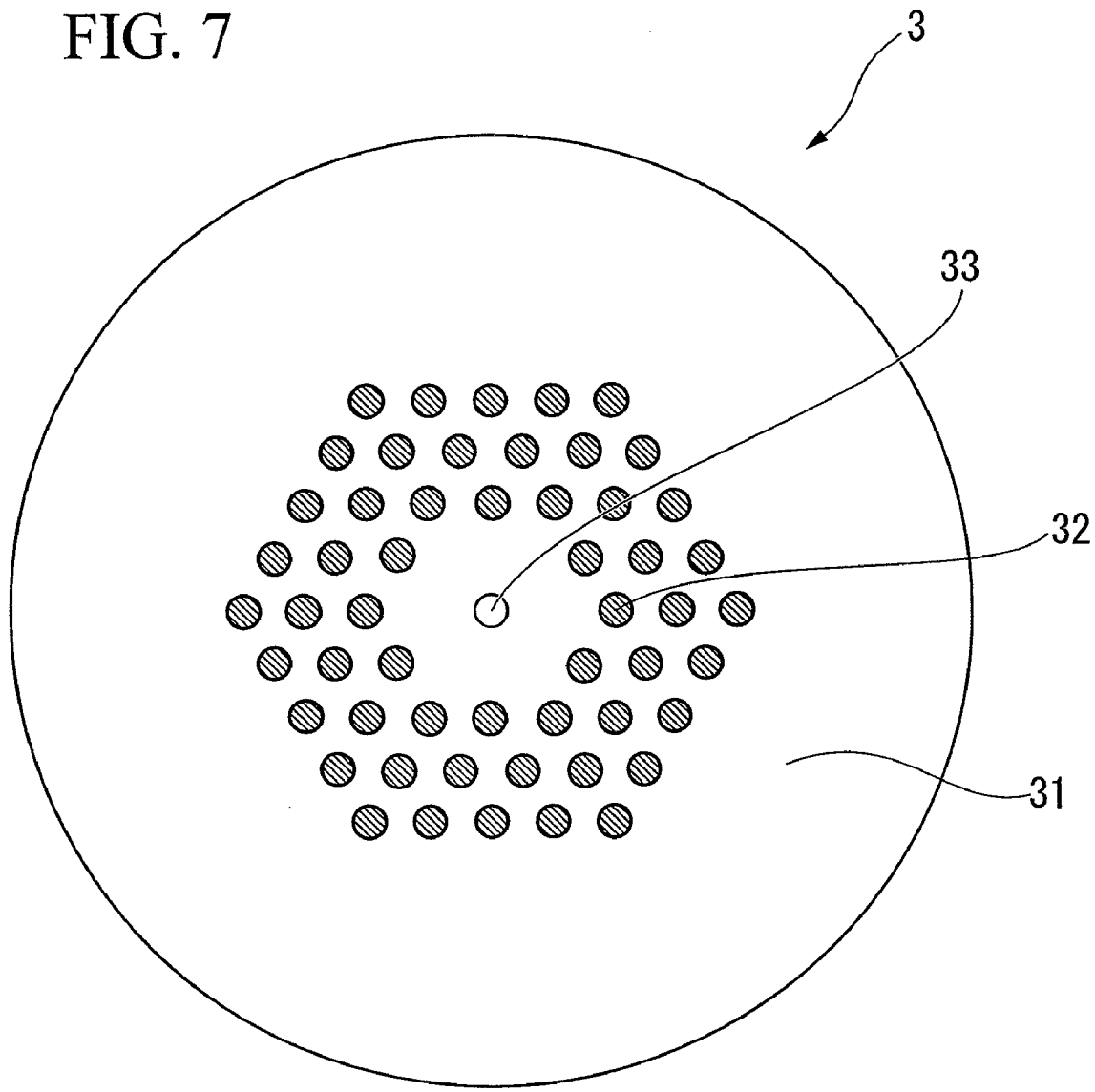
FIG. 7 is a cross-sectional view of a fiber of exemplary Embodiment 3 according to the present invention.

FIG. 7 is a cross-sectional view that shows the structure of a fiber 3 of exemplary Embodiment 3 according to the present invention.

In the fiber 3, high refractive index portions 32 which are made of germanium dioxide doped silica glass, and have a relative refractive-index difference of 2.0% with respect to pure silica glass, are provided in a first cladding 31 made of pure silica glass with a triangular lattice periodic structure to form a photonic band. Similarly to Embodiment 1, the triangular lattice structure has a layered structure circumferentially centered around a core 33, having a relative refractive-index difference of 0.7% with respect to pure silica glass, where each layer comprises a ring of adjacent high index refraction portions together forming a lattice structure with a lattice constant Λ. A spacing equivalent to the size of a layer including six high refractive index portions resides between the core 33 and the innermost high refractive index portions of the lattice structure. For example, such a lattice structure can provide a spacing of at least $\sqrt{3}\Lambda$ between the core and the high refractive index portions of the innermost layer.

An interval Λ between the high refractive index portions 32 is 7.8 μm, the diameter d of the high refractive index portion 32 is 0.5 Λ, and the diameter of the first core 33 is 0.5 Λ. Also, the periodic structure of the high refractive index portions 32 is formed in three layers. The diameter of the first cladding 31 made of pure silica glass is 125 μm. Also, for comparison, a fiber having the same parameters except for not having a periodic structure by the high refractive index portions 32 was manufactured.

Figure 8:
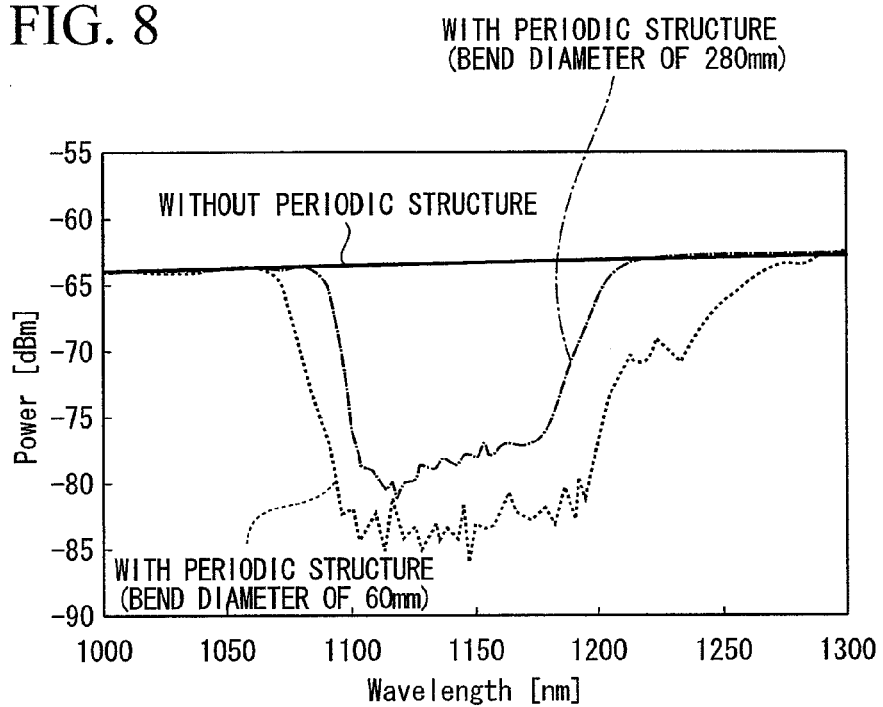
FIG. 8 is a graph that shows the transmission spectrum of the fiber of exemplary Embodiment 3.

After this fiber 3 and the fiber manufactured for comparison were extracted by 4 m, respectively, and wound around a tube with a diameter of 280 mm, the fibers were fusion-spliced with separate optical fibers, and only the first core 33 was illuminated with a white light source. FIG. 8 shows the result of measuring the respective transmission spectrums. From these transmission spectrums, it is evident that only in the case of having a periodic structure, the power of the transmission light becomes less between wavelengths of 1090 and 1220 nm. Also, for other wavelengths, it is evident that the power of the transmission light does not change, and the splice characteristics do not change for a periodic structure.

Also, FIG. 8 shows the result of measuring the transmission spectrum in the same way by winding this fiber 3 around a tube with a diameter of 60 mm. By applying tight bending to the fiber, it is evident that mode coupling is induced, and the transmission spectrum has changed. Also, even by inducing mode coupling by twisting or the like as well as bending, it is possible to change the transmission spectrum.

Figure 9:
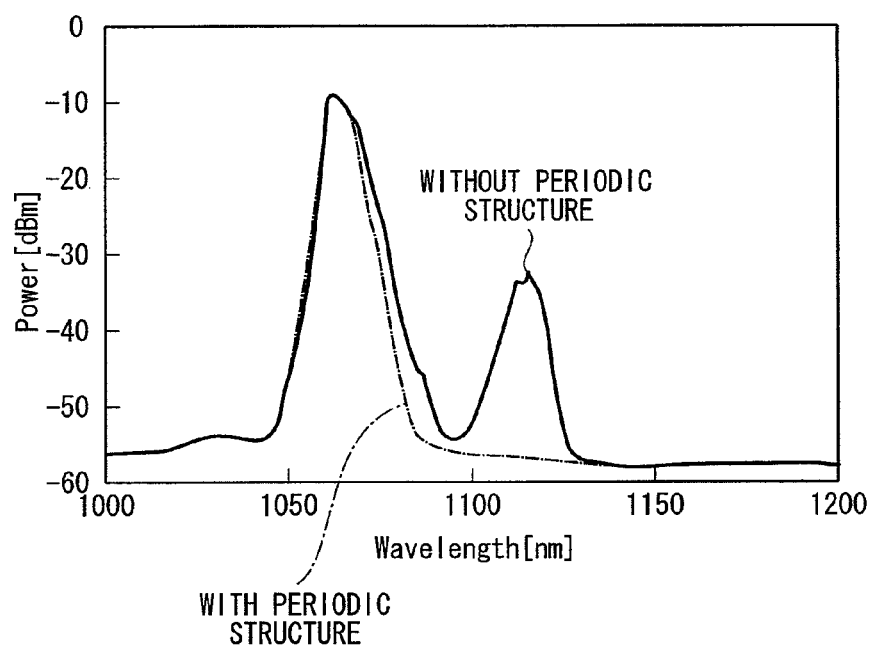
FIG. 9 is a graph that shows the spectrum of output light from the light-guiding fiber of exemplary Embodiment 3.

Next, after this fiber 3 was extracted by 200 m and wound around a tube with a diameter of 200 mm, a pulse laser of a wavelength of 1.06 μm was launched thereinto. FIG. 9 shows the result of measuring the spectrum of the emitted light. From FIG. 9, stimulated Raman scattering is not observed in the wavelength range of 1.1 μm to 1.2 μm. Meanwhile, the fiber that was manufactured for comparison was also extracted by 200 m and the pulse laser was similarly launched thereinto. In this case, stimulated Raman scattering is observed around a wavelength of 1120 nm, and so it is evident that the fiber 3 of Embodiment 3 effectively suppresses stimulated Raman scattering.

Figure 10:
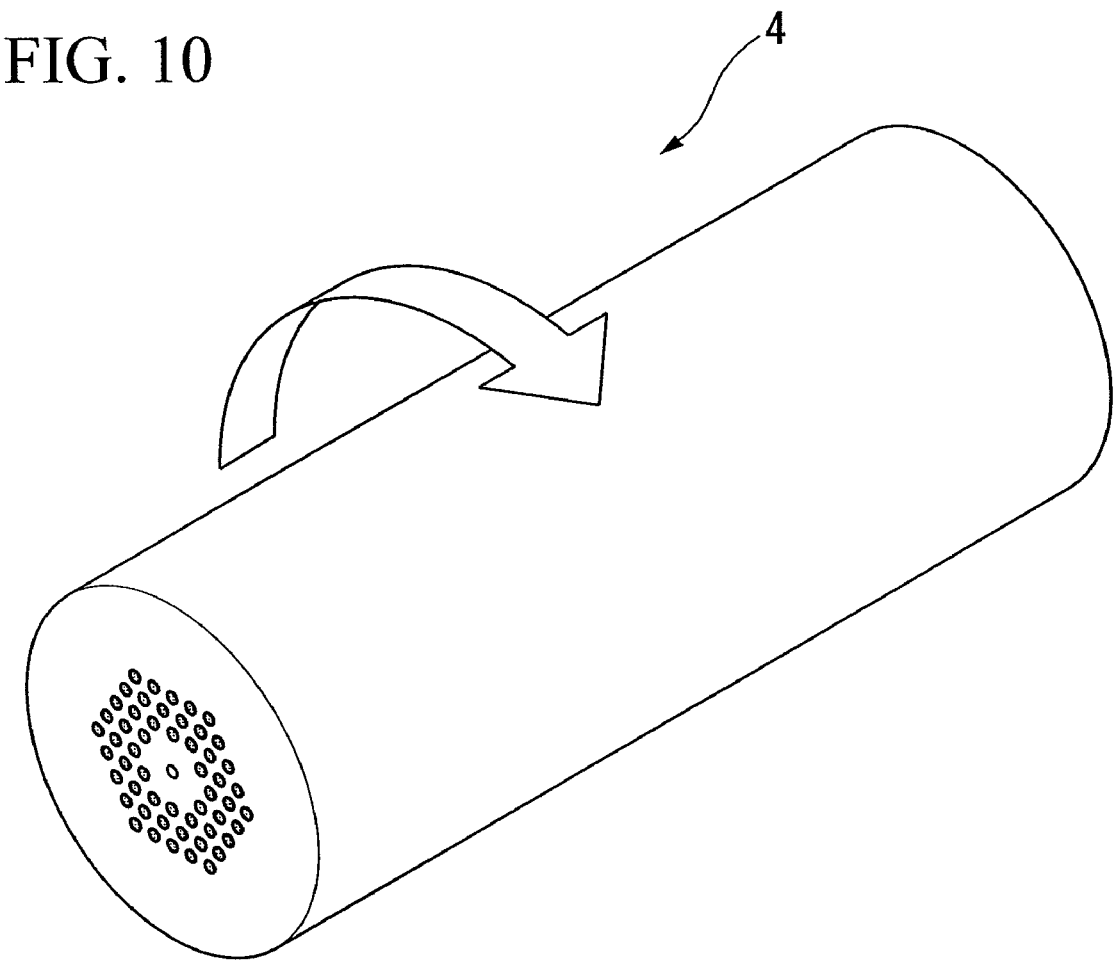
FIG. 10 is a perspective view of a fiber of exemplary Embodiment 4 of the present invention.

FIG. 10 is a cross-sectional view that shows the structure of a fiber 4 of exemplary Embodiment 4 according to the present invention. The fiber 4 of the present embodiment has the same cross-sectional structure as the fiber of Embodiment 3, but twisting is applied to the fiber 4 in the melted state when drawing the fiber. Thereby, the high refractive index portion is in a spiral state, that is, in a state where bending is substantially applied in the lengthwise direction, and so losses such as macrobending and microbending occur. On the other hand, since the fiber 4 has rotational symmetry, bending in the lengthwise direction does not occur in the core at the center through which the signal light propagates. Accordingly, the fiber of exemplary Embodiment 4 can further enhance the cut-off effect of unnecessary wavelengths that propagate through the surrounding high refractive index portions without increasing the loss of the signal light that is guided through the core.

Also, when using the fiber as a fiber for an amplifier with a double-clad structure, it is possible to prevent the phenomenon in which the pumping light is guided through the high refractive index portion and is not used for amplification of the signal light, and so it is possible to raise the utilization efficiency of the pumping light in the amplifier.

Figure 11:
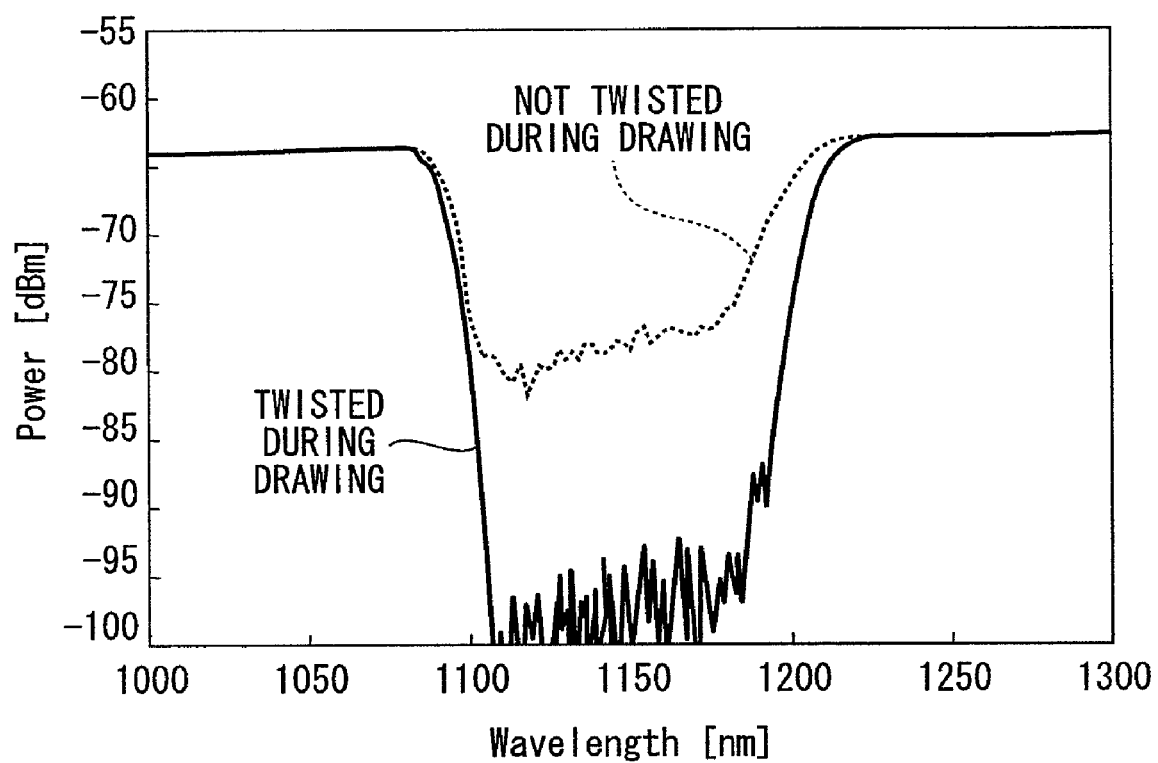
FIG. 11 is a graph that shows the transmission spectrum of the fiber of exemplary Embodiment 4.

Twisting of nearly a sine wave type, in which the period P of the twisting is 1 cm and the maximum angle A of the twisting is $20\pi$ radians, is applied to the fiber 4 of Embodiment 4. FIG. 11 shows the transmission spectrum measured by the same method as Embodiment 3 using 4 m of this fiber. Compared to Embodiment 3, it is evident that the wavelength filter effect has increased.

In sine wave type twisting, the angle $\theta$ (z) of the twisting of the fiber in the length z of the lengthwise direction of the fiber is expressed as follows by the relationship between the period P of the twisting of the fiber and the maximum angle A of the twisting.

$$\theta(z) = A \times \sin(2\pi \times z / P)$$

In exemplary Embodiment 4, twisting of approximately 3 rotations for every 0.25 cm is applied to the fiber, which is an extremely difficult twisting amount to apply after the fiber has hardened.

"Radiation from single-mode helical fibres," (J. D. Love, et al., Electronics Letters, Vol. 23, No. 21, pp. 1109 to 1110, 1987) discloses losses of a fiber in which the core is in a spiral state in the lengthwise direction. This can serve as an indicator for finding out what extent of twisting is needed in order for light that has leaked out to the high refractive index portion to induce a loss in the photonic bandgap fiber of Embodiment 4. In fact, although loss differs depending on the shape of the core, the order of modes, radius of the spiral, and the like, the non-patent document shows that, in order to obtain loss of 1 dB/m or more in a range of the refractive index profile which can be realized in conventional silica-based optical fibers, twisting of 1 rotation for about every 5 millimeters (mm) is needed. The non-patent document discloses applying twisting in one direction to the fiber. However, as long as twisting of a minimum of 1 rotation for about every 5 mm is applied on average, even if employing sine wave type twisting or another type of twisting, light that has leaked out to the high refractive index portion can be received as a loss. Also, as more twisting is applied, it is possible to increase the loss of the light that has leaked out to the high refractive index portions.

Figure 12:
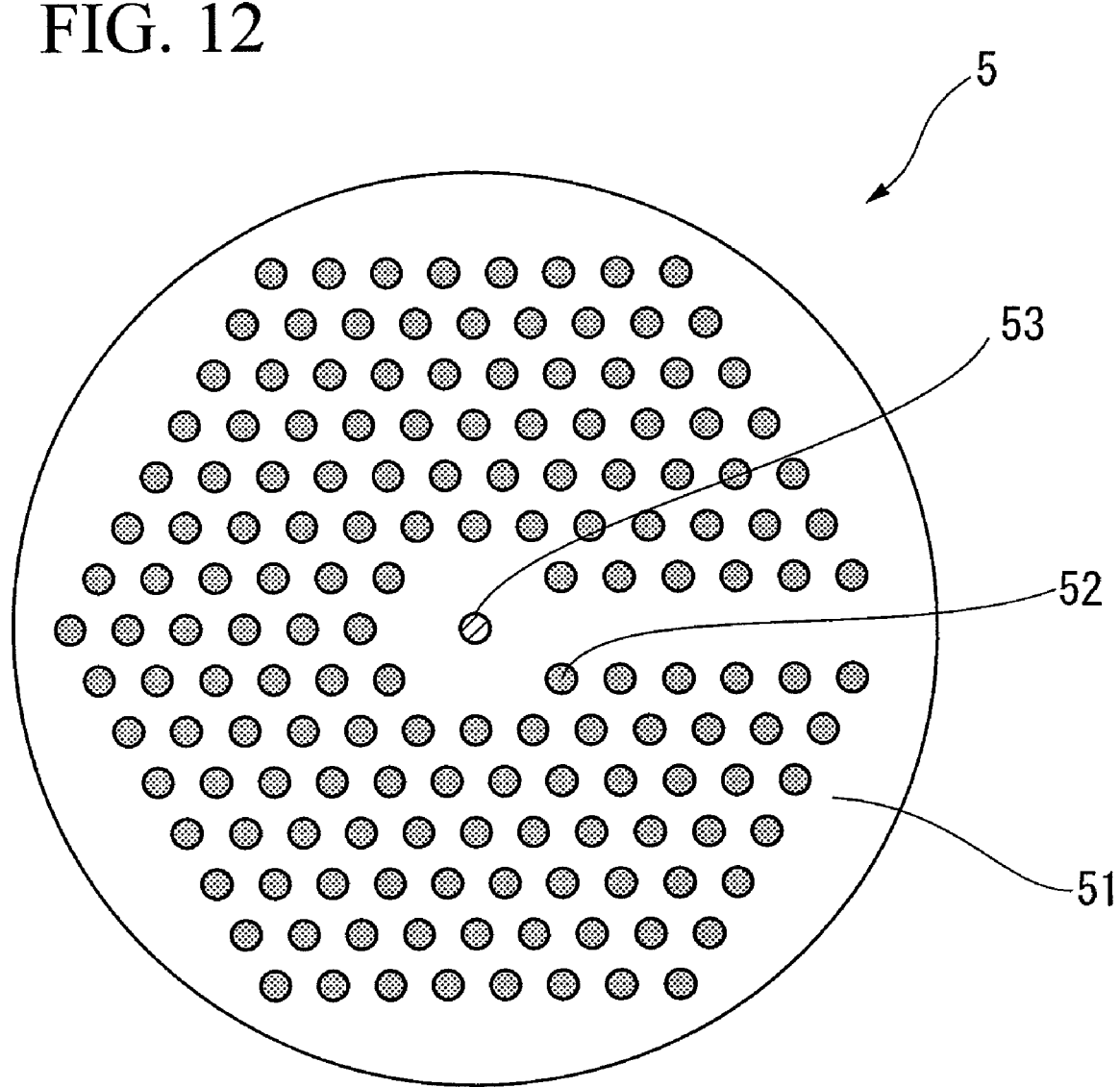
FIG. 12 is a cross-sectional view of a fiber of exemplary Embodiment 5 according to the present invention.

FIG. 12 is a cross-sectional view that shows the structure of a fiber 5 of exemplary Embodiment 5 according to the present invention. High refractive index portions 52 which are made of germanium dioxide doped silica glass, and have a relative refractive-index difference of 2.0% with respect to pure silica glass, are provided in a first cladding 51 made of pure silica glass with a triangular lattice periodic structure to form a photonic band. Similar to Embodiment 1, the triangular lattice structure has a layered structure circumferentially centered around a core 53, having a relative refractive-index difference of 0.7% with respect to pure silica glass, where each layer comprises a ring of adjacent high index refraction portions together forming a lattice structure with a lattice constant $\Lambda$. A spacing equivalent to the size of a layer including six high refractive index portions between the core 53 and the innermost high refractive index portions of the lattice structure. For example, such a lattice structure can provide a spacing of at least $\sqrt{3}\Lambda$ between the core and the high refractive index portions of the innermost layer. However, the characteristic structure of fiber 5 is that there is a circumferential spacing in the lattice structure in the shape of a straight line extending from the core to outside the lattice structure.

Figure 13:
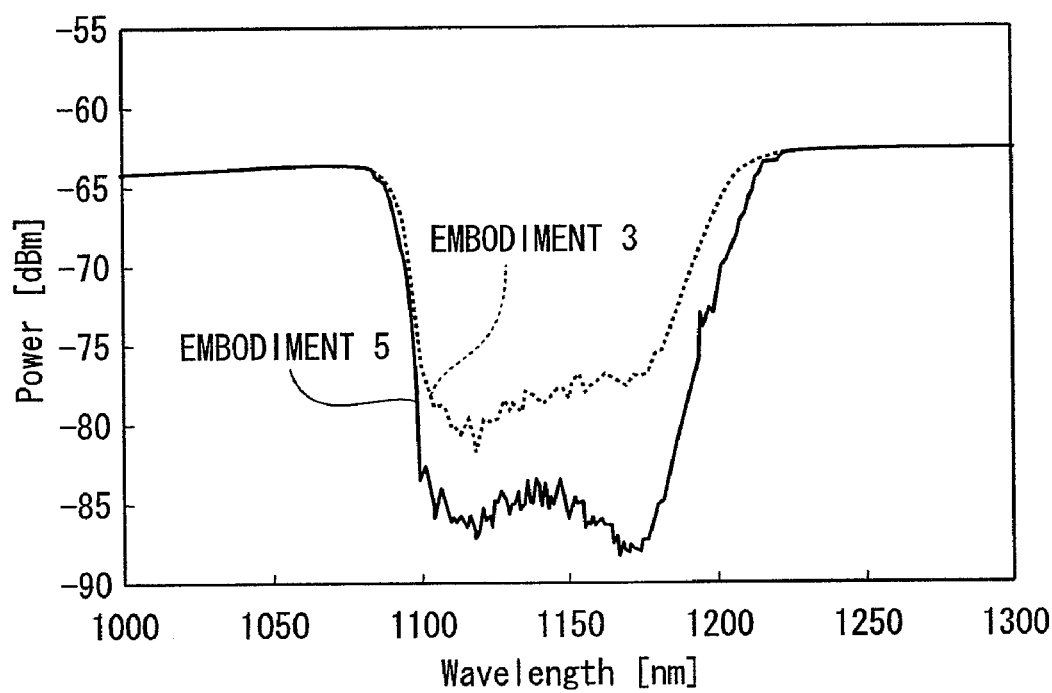
FIG. 13 is a graph that shows the transmission spectrum of the fiber of exemplary Embodiment 5.

When the number of layers of the high refractive index portions is increased, the ratio of light passing through the high refractive index portions increases, and it is possible to increase the wavelength filter effect. On the other hand, there are the problems that confining by the photonic bandgap effect becomes strong, and so the cut-off wavelength becomes longer as a result of high-order modes also being confined. However, in the fiber 5 of Embodiment 5, since there is a circumferential spacing, the high-order modes leak out to the cladding through the region where the high refractive index portions 52 are not provided. For that reason, the fiber of Embodiment 5 can increase the wavelength filter effect while keeping the cutoff wavelength short. Similar to Embodiment 3, the fiber was extracted by 4 m, and wound around a tube with a diameter of 280 mm. FIG. 13 shows the result of measuring the transmission spectrum. Compared to Embodiment 3, it is evident that the wavelength filter effect is improved. For that reason, when launching a pulse laser with a wavelength of 1.06 µm, it is possible to more effectively suppress stimulated Raman scattering. Also, the cut-off wavelength of the fiber is 0.8 µm or less, which is a cut-off wavelength shorter than that of the fiber of Embodiment 3, and the fiber operates as a single mode at a wavelength of 1.06 µm, that is a wavelength of a general signal light of an ytterbium fiber laser.

Figure 14:
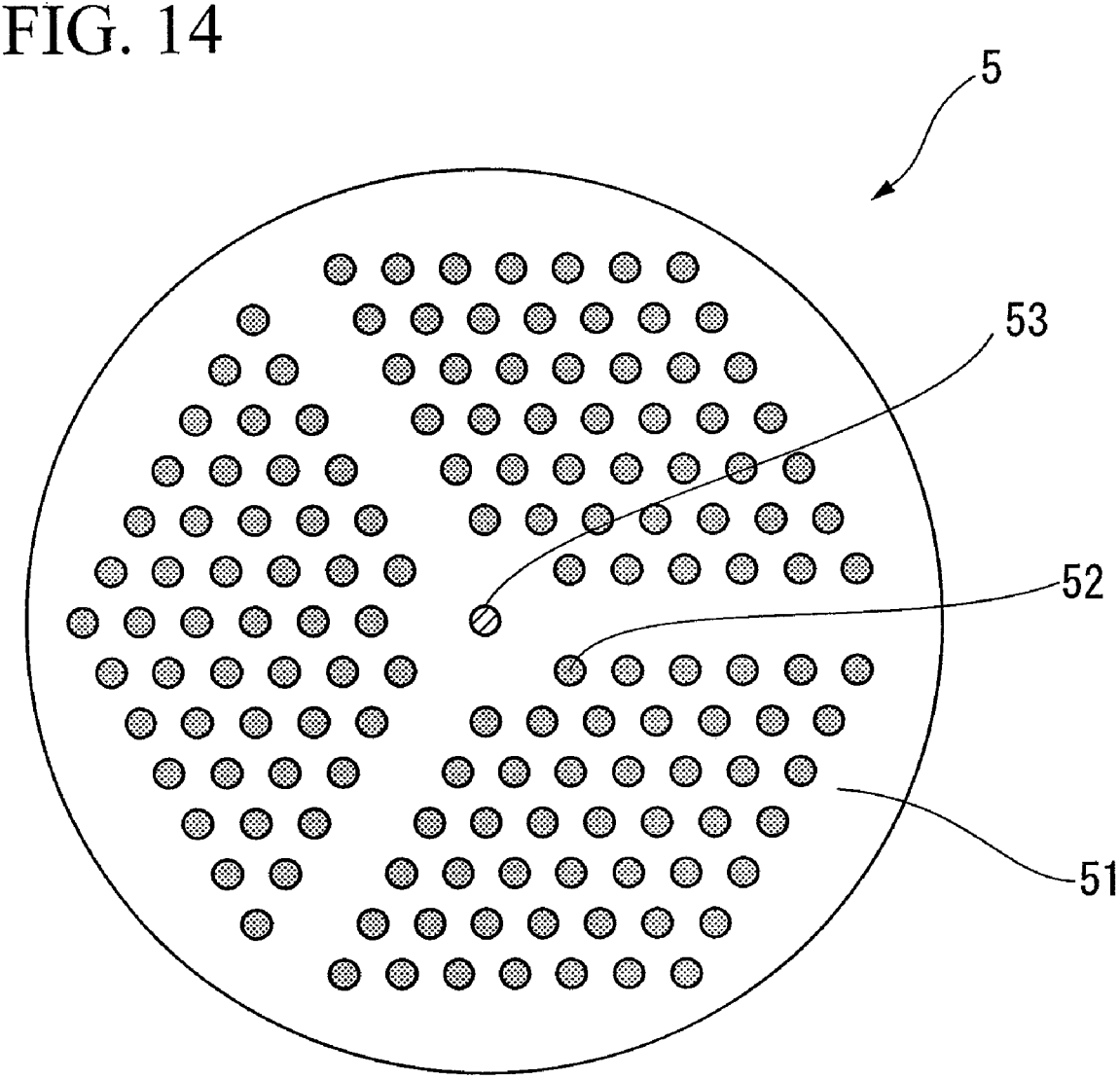
FIG. 14 is a cross-sectional view of another fiber of exemplary Embodiment 5 according to the present invention.

In the photonic bandgap fiber of Embodiment 5, the circumferential spacing is in the form of a single radial region extending from the core to outside the lattice structure, but is not limited to this form, and may be suitably changed. In particular, in the case of wanting to reduce the effect of the change of the cutoff wavelength due to the bending direction when using a fiber bent in a coiled state, as shown for example in FIG. 14, a plurality of circumferential spacings each in the form of a single radial region extending from the innermost layer to the outermost layer of the lattices may be used. Also, in the photonic bandgap fiber of Embodiment 5, the circumferential spacing is a straight-line shape in that it is straight when viewed in cross-section, but circumferential spacing is not limited to a straight-line shape and may be one that includes a curve when viewed in cross-section, as long as the periodic structure formed by the high refractive index portions is not provided around the entire circumference of the core and extends from the first core to the outside.

Figure 15:
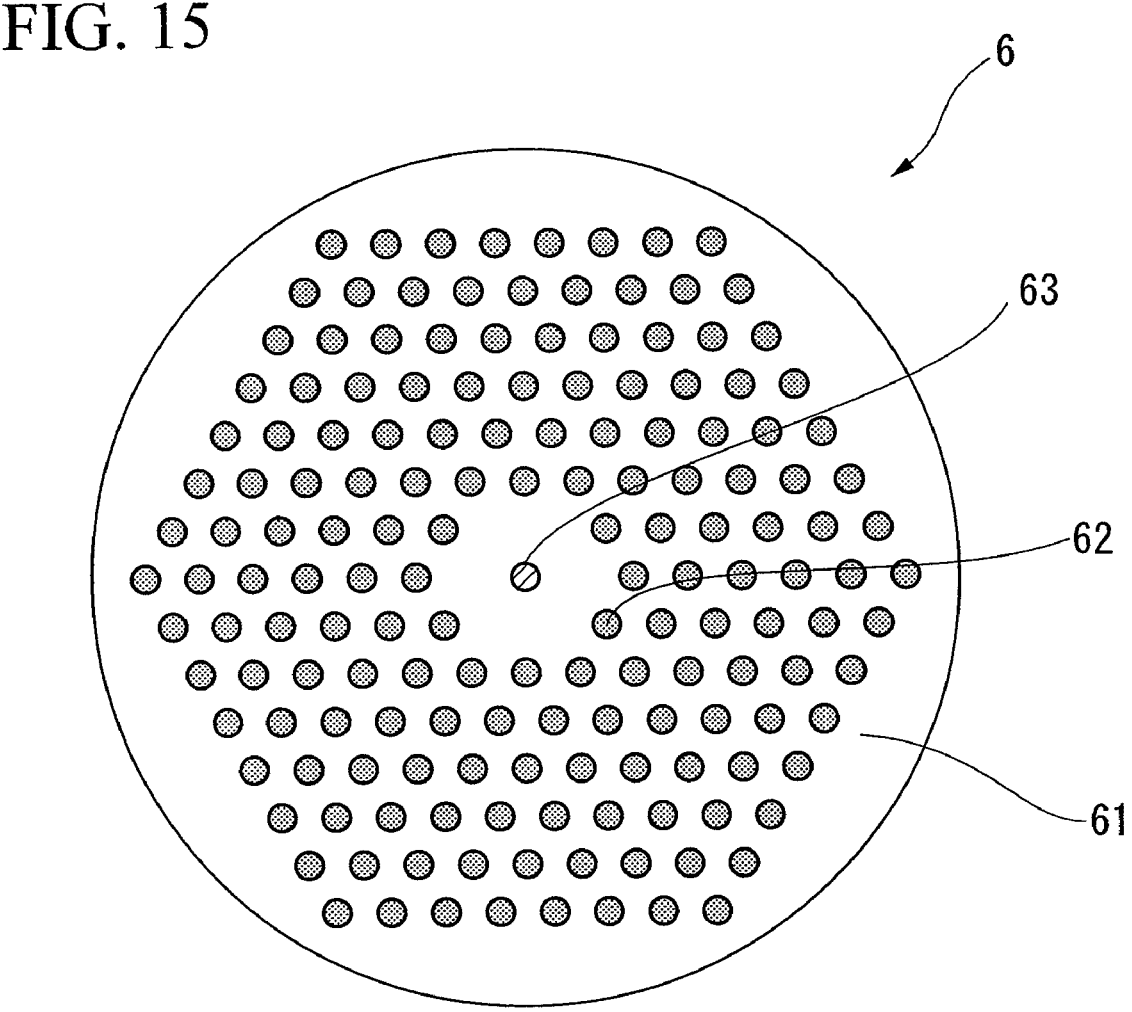
FIG. 15 is a cross-sectional view of a fiber of exemplary Embodiment 6 according to the present invention.

For the purpose of comparison, as shown in FIG. 15, a fiber 6 in which high refractive index portions 62 are disposed around the entirety of the area along the circumference of a first core 63, and the other structures of which are similar to the fiber of Embodiment 5, was manufactured. The fiber 6 shows transmission characteristics mostly similar to the fiber of Embodiment 5 with respect to the fundamental mode. However, since the first core 63 is completely surrounded by the high refractive index portions 62, high-order modes are also confined by the photonic bandgap effect, the cutoff wavelength becomes 1.1 μm or more, and it is not desirable to use as a single mode fiber at a wavelength of 1.06 μm.

Figure 16:
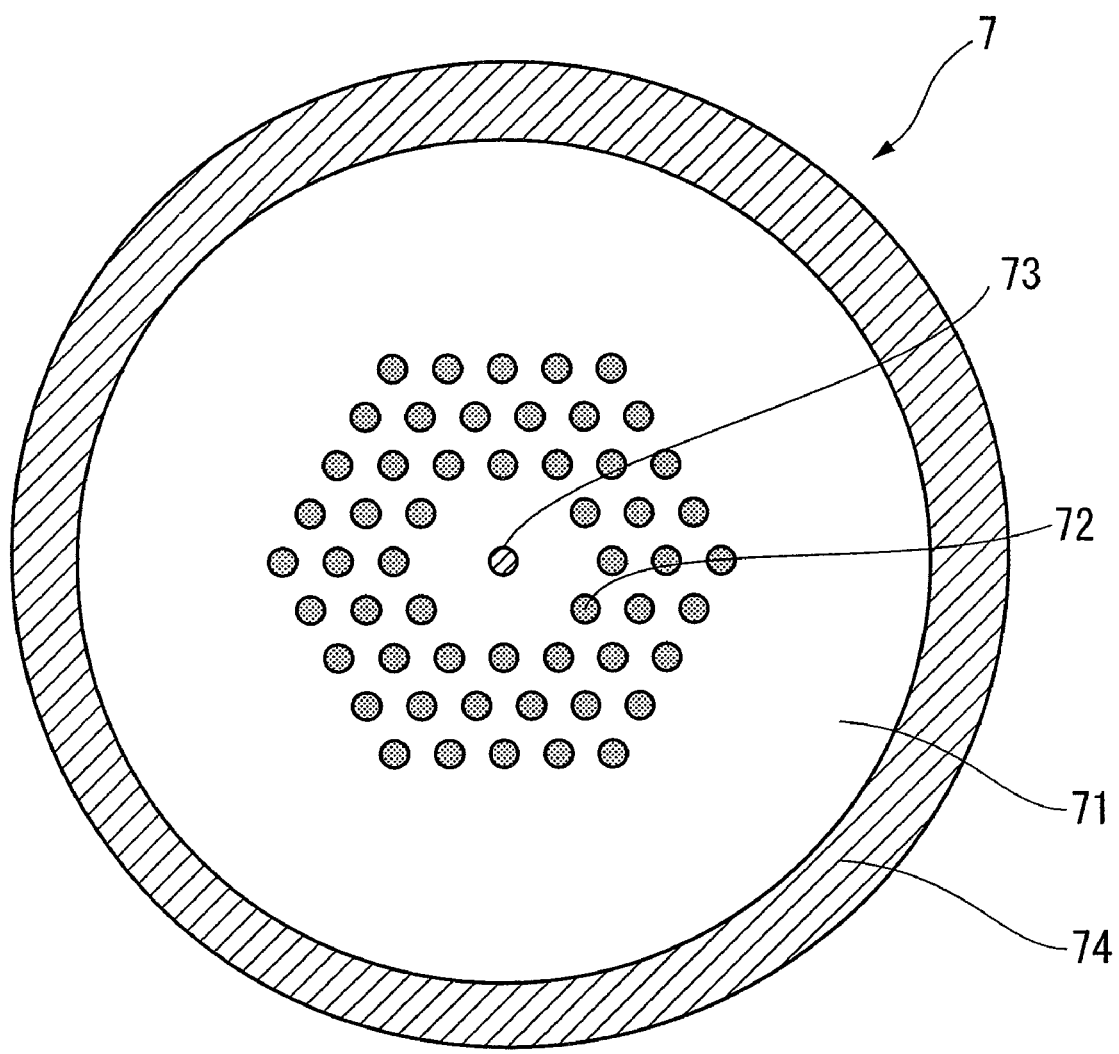
FIG. 16 is a cross-sectional view of a fiber of exemplary Embodiment 7 according to the present invention.

FIG. 16 is a cross-sectional view that shows the structure of a fiber 7 of exemplary Embodiment 7 according to the present invention. The fiber 7 has the same cross-sectional structure as the fiber of Embodiment 3, but ytterbium is added to a first core 73, thulium is added to high refractive index portions 72, and a fluorine-based ultraviolet curable resin layer 74 having a relative refraction index difference of −4% with respect to pure silica glass is disposed around a first cladding 71, resulting in a so-called double-clad structure in which multi-modes are guided while the first cladding 71, made of pure silica glass, serves as a second core, and the fluorine-based ultraviolet curable resin layer 74 as a second cladding. The diameter of the first cladding is 150 μm, and the absorption amount of ytterbium in the cladding when light of a wavelength of 915 nm is launched throughout the first cladding is 1 dB/m. Also, the absorption amount of thulium with respect to light of a wavelength of 1.1 μm that passes through the high refractive index portion is approximately 5 dB/m.

Figure 17:
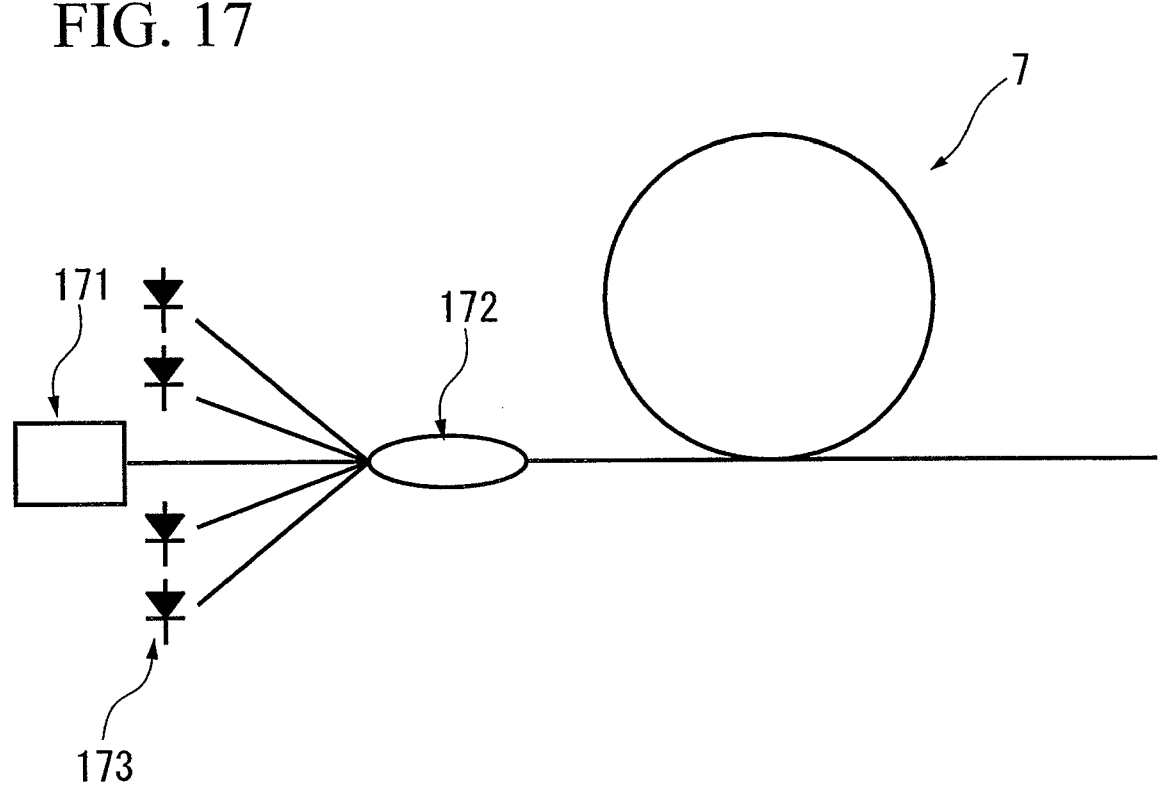
FIG. 17 is a schematic view of an optical amplifier that uses the fiber of exemplary Embodiment 7.
Figure 18:
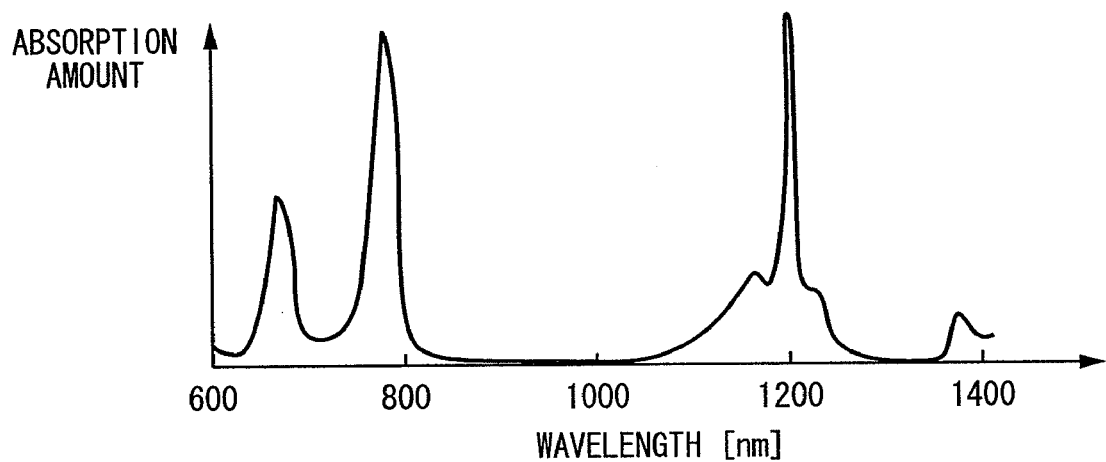
FIG. 18 is a graph that shows the absorption spectrum of thulium.

Using 10 m of this fiber 7, an optical amplifier shown in FIG. 17 was manufactured. A pulse emitted from a pulse light source 171 with a pulse width of 50 ns, peak power of 60 Watts (W), repetition frequency of 20 kilohertz (kHz), and wavelength of 1.06 μm was launched into the core of the fiber 7 through a pump combiner 172. Also, four semiconductor lasers 173 with a wavelength of 915 nm were connected to the pump combiner, and pumping light of a total of 6 W was launched into the entire first cladding of the fiber 7, and amplification of the pulse light was performed. Then, with respect to the light in a band of 1.1 to 1.2 μm generated by the spontaneous Raman scattering in the fiber 7, since both effects of immediately spreading the light from the core to the cladding and of the light being absorbed by the thulium thereafter occur, it is possible to effectively suppress generation of stimulated Raman scattering. Meanwhile, as shown by the absorption spectrum in FIG. 18, since thulium absorption hardly occurs with respect to the wavelength of 915 nm, unnecessary absorption of pumping light in the fiber 7 can be avoided. The pulse width of the pulse that was output from the fiber 7 was 50 nanoseconds (ns), the peak power was 6 kW, and the repetition frequency was 20 kHz.

Figure 19:
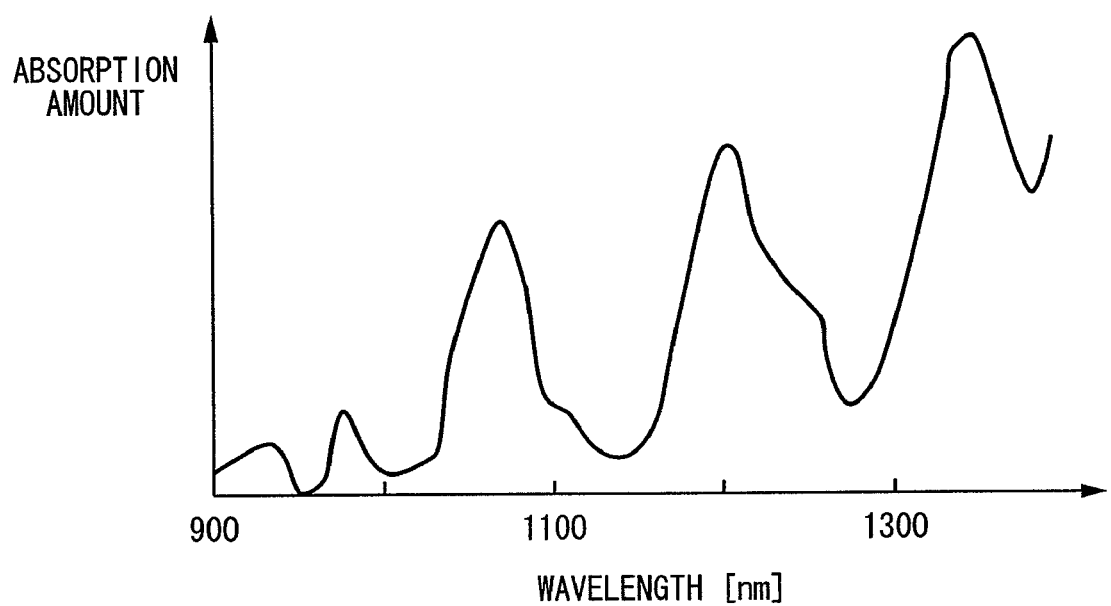
FIG. 19 is a graph that shows the absorption spectrum of samarium.
Figure 20:
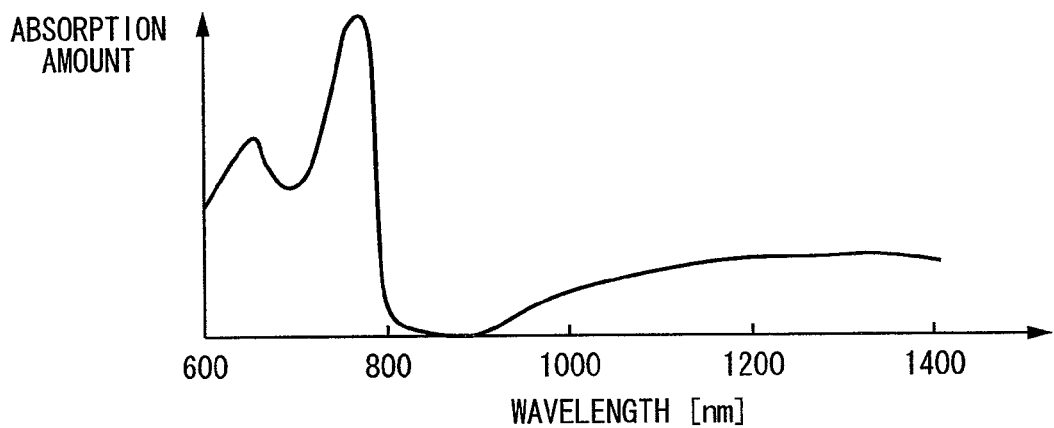
FIG. 20 is a graph that shows the absorption spectrum of cobalt.

Although thulium was used in the present embodiment, as shown by the absorption spectrums in FIG. 19 and FIG. 20, a similar effect can also be obtained by using a dopant such as samarium and cobalt. Also, it is possible to set a suitable dopant in accordance with the wavelength of the pumping light and the signal light.

The invention claimed is:

1. A photonic bandgap fiber comprising:
   a core,
   a cladding that surrounds the core, and
   a plurality of high refractive index portions disposed within the cladding;
   wherein the plurality of high refractive index portions has a refractive index higher than a refractive index of the cladding and are provided in the cladding forming a triangular lattice structure with a lattice constant Λ,
   wherein a refractive index of the core is higher than the refractive index of the cladding and lower than the refractive index of the plurality of high refractive index portions, and
   wherein a coupling length between the core and a plurality of high refractive index portions that is closest to the core is longer than a coupling length between adjacent high refractive index portions, for wavelengths of light for which the propagation of light in the core is suppressed.

2. The photonic bandgap fiber according to claim 1, wherein the fiber is bent or twisted.

3. The photonic bandgap fiber according to claim 1, wherein twisting is applied to the fiber in a melted state during drawing such that the fiber is permanently twisted.

4. The photonic bandgap fiber according to claim 1, wherein the core optically amplifies light input therein.

5. The photonic bandgap fiber according to claim 1, further comprising a medium having a lower refractive index than the cladding, the medium covering the cladding, thus forming a double clad structure.

6. The photonic bandgap fiber according to claim 1, wherein at least one of a part of the plurality of high refractive index portions and a part of the cladding which surrounds the plurality of high refractive index portions has an optical absorption characteristic.

7. An optical amplifier comprising the photonic bandgap fiber according to claim 6, wherein
   at least a pumping light having a wavelength of 915 nanometers (nm) propagates through the fiber; and
   at least one layer of the surrounding cladding does not have an optical absorption characteristic with respect to the pumping light.

8. A photonic bandgap fiber comprising:
   a core;
   a cladding that surrounds the core, and
   a plurality of high refractive index portions disposed within the cladding,
   wherein the plurality of high refractive index portions has a refractive index higher than a refractive index of the cladding and are provided in the cladding forming a triangular lattice structure with a lattice constant Λ,
   wherein a refractive index of the core is higher than the refractive index of the cladding and lower than the refractive index of the plurality of high refractive index portions; and
   wherein a coupling length between the core and a high refractive index portion that is closest to the core is longer than a coupling length between adjacent high refractive index portions, for wavelengths of light for which the propagation of light in the core is suppressed, and
   wherein there is at least one spacing in the lattice structure, extending radially from the core, in which high refractive index portions are disposed.

9. The photonic bandgap fiber according to claim 8, wherein the fiber is bent or twisted.

10. The photonic bandgap fiber according to claim 8, wherein twisting is applied to the fiber in a melted state during drawing such that the fiber is permanently twisted.

11. The photonic bandgap fiber according to claim 8, wherein the core optically amplifies light input therein.

12. The photonic bandgap fiber according to claim 8, further comprising a medium having a lower refractive index than the cladding, the medium covering the cladding, thus forming a double clad structure.

13. The photonic bandgap fiber according to claim 8, wherein at least one of a part of the plurality of high refractive index portions and part of the cladding which surrounds the plurality of high refractive index portions has an optical absorption characteristic.

14. An optical amplifier comprising the photonic bandgap fiber according to claim 13, wherein
- at least a pumping light having a wavelength of 915 nanometers (nm) propagates through the fiber; and
- at least one layer of the surrounding cladding does not have an optical absorption characteristic with respect to the pumping light.

15. An optical amplifier comprising the photonic bandgap fiber according to claim 1.

16. An optical amplifier comprising the photonic bandgap fiber according to claim 8.

17. The photonic bandgap fiber according to claim 1, wherein the lattice structure comprises the plurality of high refractive index portions disposed in at least three circumferential layers.

18. The photonic bandgap fiber according to claim 8, wherein the lattice structure comprises the plurality of high refractive index portions disposed in at least three circumferential layers.

19. The photonic bandgap fiber according to claim 1, wherein a distance between the high refractive index portion closest to the core and the core is at least $-\sqrt{3}\Lambda$.

20. The photonic bandgap fiber according to claim 8, wherein a distance between the high refractive index portion closest to the core and the core is at least $-\sqrt{3}\Lambda$.

* * * * *

UNITED STATES PATENT AND TRADEMARK OFFICE
CERTIFICATE OF CORRECTION

PATENT NO.        : 8,035,891 B2                                        Page 1 of 1
APPLICATION NO.   : 12/429683
DATED             : October 11, 2011
INVENTOR(S)       : Ryuichiro Goto It is certified that error appears in the above-identified patent and that said Letters Patent is hereby corrected as shown below:

On the Title page, item [56] add:

US Patent Documents
2005/0069269  A1  03/2005 Libori et al.
2002/0061176  A1  05/2002 Libori et al.

Foreign Patent Documents
WO  2004/020352  A2  03/2004
WO  02/012931    A2  02/2002

Other Publications
J.M. Fini et al. "Design of Solid Microstructure Fibers for Suppression of Higher-Order modes", OPTICS EXPRESS, OSA (OPTICAL SOCIETY OF AMERICA), vol. 13, no. 9, 2 May 2005, pp. 3477-3490.

European Search Report issued in European Application No. 07830967.1 dated July 5, 2011.

JAGERSKA, J., et al., "Coupling length of silicon-on insulator directional couplers probed by Fourier-space imaging", APPLIED PHYSICS LETTERS, vol. 92, 151106, 14 April 2008 (2008-04-14), pp. 151106-1-151106-3.

CALO, G. et al., "Design of cladding pumped microstructured fiber amplifier", OPTICAL MATERIALS, vol. 28, no. 11, 1 August 2006 (2006-08-01), pp. 1243-1246, ELSEVIER SCIENCE PUBLISHERS B.V. AMSTERDAM, NL, ISSN: 0925-3467, DOI: 10.1016/J. OPTMAT.2006.02.02.012 [retrieved on 2006-08-01].

EGGLETON, B.J. et al., "Cladding-Mode-Resonances in Air-Silica Microstructure Optical Fibers", JOURNAL OF LIGHTWAVE TECHNOLOGY, vol. 18, no. 8, 1 August 2000 (2000-08-01), "IEEE SERVICE CENTER, NEW YORK, NY, US.

Signed and Sealed this
Thirty-first Day of July, 2012

David J. Kappos
*Director of the United States Patent and Trademark Office*